United States Patent
Yamada

(10) Patent No.: US 12,554,446 B2
(45) Date of Patent: Feb. 17, 2026

(54) DATA PROCESSING METHOD FOR MANAGING FIRST IMAGE PROCESSING DEVICE AND SECOND IMAGE PROCESSING DEVICE USING SERVER

(71) Applicant: BROTHER KOGYO KABUSHIKI KAISHA, Nagoya (JP)

(72) Inventor: Takatsugu Yamada, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/883,016

(22) Filed: Sep. 12, 2024

(65) Prior Publication Data

US 2025/0110674 A1    Apr. 3, 2025

Related U.S. Application Data

(63) Continuation of application No. 18/323,189, filed on May 24, 2023, now Pat. No. 12,124,752.

(30) Foreign Application Priority Data

May 30, 2022    (JP) .................................. 2022-087854

(51) Int. Cl.
*G06F 3/12*    (2006.01)

(52) U.S. Cl.
CPC .......... *G06F 3/1261* (2013.01); *G06F 3/1222* (2013.01); *G06F 3/1238* (2013.01)

(58) Field of Classification Search
None
See application file for complete search history.

(56) References Cited

U.S. PATENT DOCUMENTS

| | | | |
|---|---|---|---|
| 2016/0014623 A1* | 1/2016 | Tanner | H04W 4/50 455/552.1 |
| 2019/0320087 A1* | 10/2019 | Shimotsu | H04N 1/32101 |

FOREIGN PATENT DOCUMENTS

| | | |
|---|---|---|
| EP | 3 560 722 A1 | 10/2019 |
| JP | 2002-92299 A | 3/2002 |
| JP | 2010-117843 A | 5/2010 |
| JP | 2011-97337 A | 5/2011 |

(Continued)

OTHER PUBLICATIONS

Extended European Search Report issued in the corresponding European Patent Application No. 23175815.2, Oct. 26, 2023.

*Primary Examiner* — Andrew H Lam
(74) *Attorney, Agent, or Firm* — Merchant & Gould P.C.

(57) ABSTRACT

A data processing method is for managing first and second image processing devices using a server. In the method, the server receives a request to replace the first image processing device, acquires from the first image processing device data, and stores the acquired data as data originally stored in the first image processing device. The data originally stored in the first image processing device includes settings information. In the method, the server communicates with the second image processing device which is a replacement device. In a case that a prescribed condition is satisfied, the server sends the data originally stored in the first image processing device to the second image processing device. For satisfying the prescribed condition, satisfying a condition that a prescribed function of the first image processing device has been deactivated on the basis of the request received by the server is necessary.

17 Claims, 8 Drawing Sheets

(56) References Cited

FOREIGN PATENT DOCUMENTS

| | | |
|---|---|---|
| JP | 2016-103141 A | 6/2016 |
| JP | 2022-6513 A | 1/2022 |

\* cited by examiner

DATA PROCESSING METHOD FOR MANAGING FIRST IMAGE PROCESSING DEVICE AND SECOND IMAGE PROCESSING DEVICE USING SERVER

REFERENCE TO RELATED APPLICATIONS

This application is a continuation of U.S. patent application Ser. No. 18/323,189, filed May 24, 2023, which claims priority from Japanese Patent Application No. 2022-087854 filed on May 30, 2022. The entire content of the priority applications is incorporated herein by reference.

BACKGROUND ART

Conventionally, some businesses offer services to users of image processing devices to provide the user with special subscription-based consumables or replacement parts for their image processing device after the user has entered an agreement with the business.

For example, with the conventional technology, users purchase computer peripherals such as printers under contract, and a management device stores attribute information and status information on the computer peripherals together with the corresponding user information.

When the user requests the replacement of a peripheral device, the management device issues instructions to the manufacturer's shipping department to ship a replacement peripheral device, whereby the shipping department ships the replacement peripheral device and collects the used peripheral device.

DESCRIPTION

Once a replacement image processing device has been delivered to the user, the user may wish to transfer settings from the old device to the replacement device. However, the process of transferring settings from one image processing device such as a printer to another can be troublesome with the conventional technology.

Consequently, in a state that the old image processing device is still in an operable state, the user of this conventional technology often continues using the old device rather than switching to the replacement image processing device.

In view of the foregoing, it is an object of the present disclosure to encourage users to transition from a first image processing device to a second image processing device.

In order to attain the above and other object, the present disclosure provides a data processing method for managing a first image processing device and a second image processing device using a server. The method includes: the server receiving a request to replace the first image processing device; the server acquiring from the first image processing device data stored in the first image processing device; the server storing the acquired data as data originally stored in the first image processing device, the data originally stored in the first image processing device including settings information of the first image processing device; the server communicating with the second image processing device which is a replacement device of the first image processing device; in a case that a prescribed condition is satisfied, the server sending the data originally stored in the first image processing device to the second image processing device, wherein for satisfying the prescribed condition, satisfying a condition that a prescribed function of the first image processing device has been deactivated on the basis of the request received by the server is necessary.

According to another aspect, the disclosure provides a non-transitory computer readable storage medium storing a set of program instructions installed on and executed for controlling a server. The set of program instructions includes: receiving a request to replace a first image processing device; acquiring from the first image processing device data stored in the first image processing device; storing the acquired data as data originally stored in the first image processing device, the data originally stored in the first image processing device including settings information of the first image processing device; communicating with a second image processing device which is a replacement device of the first image processing device; and in a case that a prescribed condition is satisfied, sending the data originally stored in the first image processing device to the second image processing device, wherein for satisfying the prescribed condition, satisfying a condition that a prescribed function of the first image processing device has been deactivated on the basis of the request received by the server is necessary.

According to another aspect, the disclosure provides an image processing device. The image processing device includes a controller. The controller is configured to perform: communicating with a server; and in a state that a prescribed function of another image processing device has been deactivated upon reception of a request by a server, acquiring from the server data originally stored in the another image processing device, the data originally stored in the another image processing device including settings information of the another image processing device, the request being for replacing the another image processing device.

The above structures can prompt the user to replace the first image processing device with the second image processing device.

FIRST EMBODIMENT

Below, an embodiment of the present disclosure will be described while referring to FIGS. 1-8. In this embodiment, a laser printer will be described as an example of the image processing device, and the image process will be a printing process. However, the image processing device may be a printer other than a laser printer. For example, the image processing device may be an inkjet printer.

Overview of an Image Processing System

Figure 1:
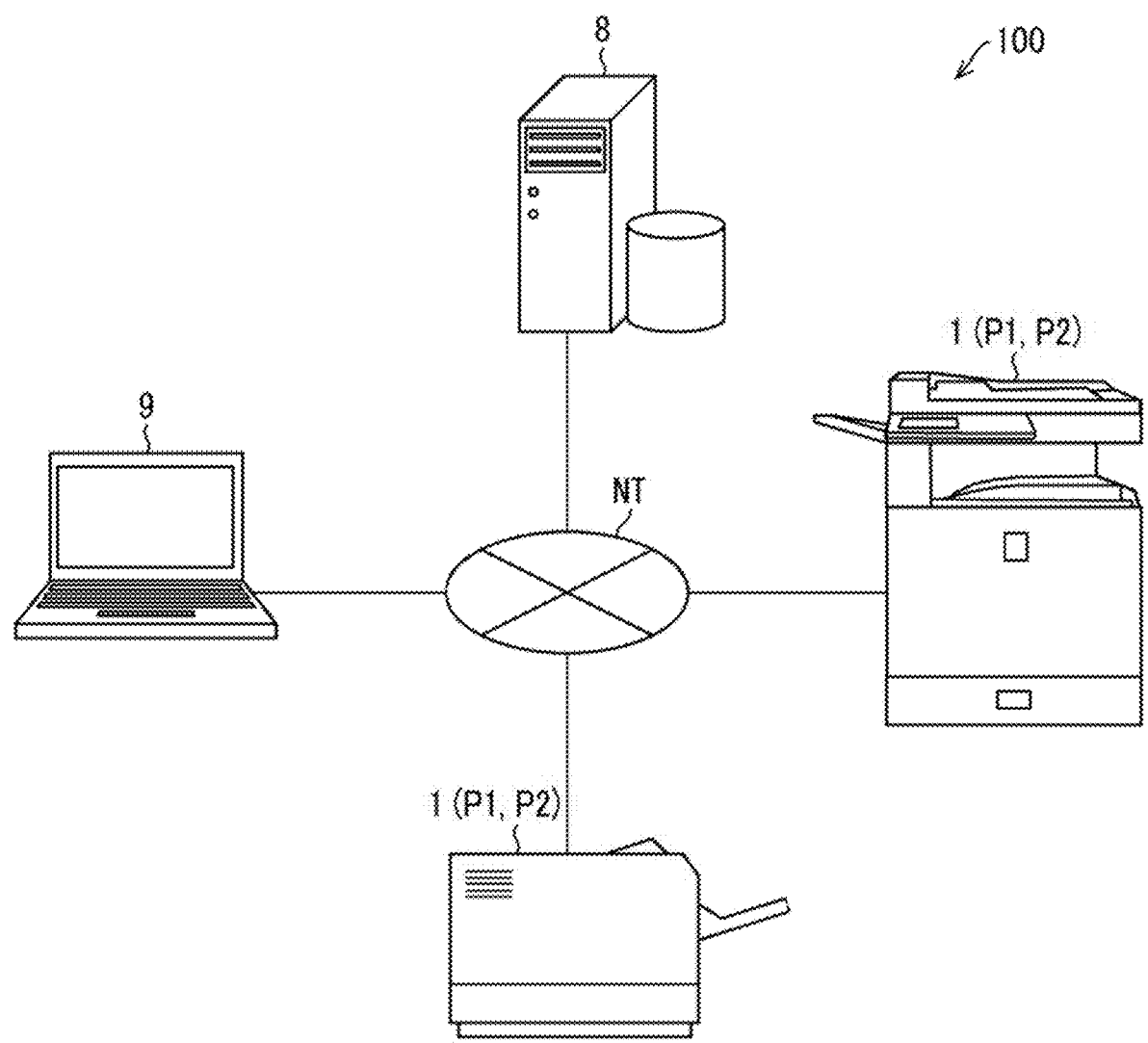
FIG. 1 is a schematic diagram illustrating an image processing system.

FIG. 1 shows an overview of an image processing system 100 according to the present embodiment. As shown in FIG. 1, the image processing system 100 includes a plurality of image processing devices 1, a server 8, and a user terminal 9. The image processing devices 1 shown in FIG. 1 have been purchased by the same user or provided for the user by a service provider. However, the image processing system 100 may include other image processing devices that are purchased by other users or provided for the user by the service provider.

The image processing device 1 is a device for implementing a service when an agreement has been concluded for the image processing device 1. The server 8 is a device that communicates with the image processing devices 1 via a network NT and serves as a management device for managing the image processing devices 1. The server is an example of the external device. In this embodiment, the server 8 is a server managed by the service provider.

The term "agreement" in the present embodiment denotes an agreement concluded between a user and a service provider by which the service provider provides a specific service to the user through one or more user-specified image processing devices 1. In other words, the user enters an agreement for one or more certain image processing devices 1. Put another way, the agreement has been concluded for one or more image processing devices 1. The image processing device 1 may also be considered the subject of the agreement. Hereinafter, each of one or more image processing devices 1 specified by the user as the subject of an agreement will be called the "subscribed device or machine."

With an agreement concluded (or established) between the user and the service provider, each image processing device 1 can use special subscription-based consumables. As an example of an agreement, the service provider providing the subscription service and the user agree on the usage period, usage fee, maximum number of sheets, and other terms of the service, and both parties agree that the service provider will provide this service to the user. In other words, once an agreement for the service has been concluded, the image processing device 1 according to the present embodiment can execute subscription printing, which is printing under the terms of the concluded agreement.

The user can register or change the image processing device 1 serving as the subscribed device (or the subject device) at any time. Here, the term "register" may indicate the action of registering a new image processing device or of re-registering a previously registered image processing device 1 which is not currently registered as the subject of the agreement or whose agreement has been canceled. The user can also register a plurality of image processing devices 1 as subjects of the agreement (subscribed devices). In other words, the user can use a plurality of image processing devices 1 simultaneously as subjects of the agreement (subscribed devices) and can change any of the image processing devices 1 being used as subjects of the agreement (subscribed devices) to another image processing device 1.

The user terminal 9 used by a user is a device that communicates with the server 8 in order to conclude or cancel agreements and perform other procedures. The user terminal 9 is an example of the external terminal. The user terminal 9 used by the user can perform operation to change the subject of the agreement from the image processing device 1 to another image processing device. An information processing terminal equipped with standard communication functions, such as a personal computer (PC) or a smartphone, may be employed as the user terminal 9. The devices configuring the image processing system 100 can communicate with each other over a communication network NT such as the Internet.

Overall Structure of an Image Processing Device 1

Figure 2:
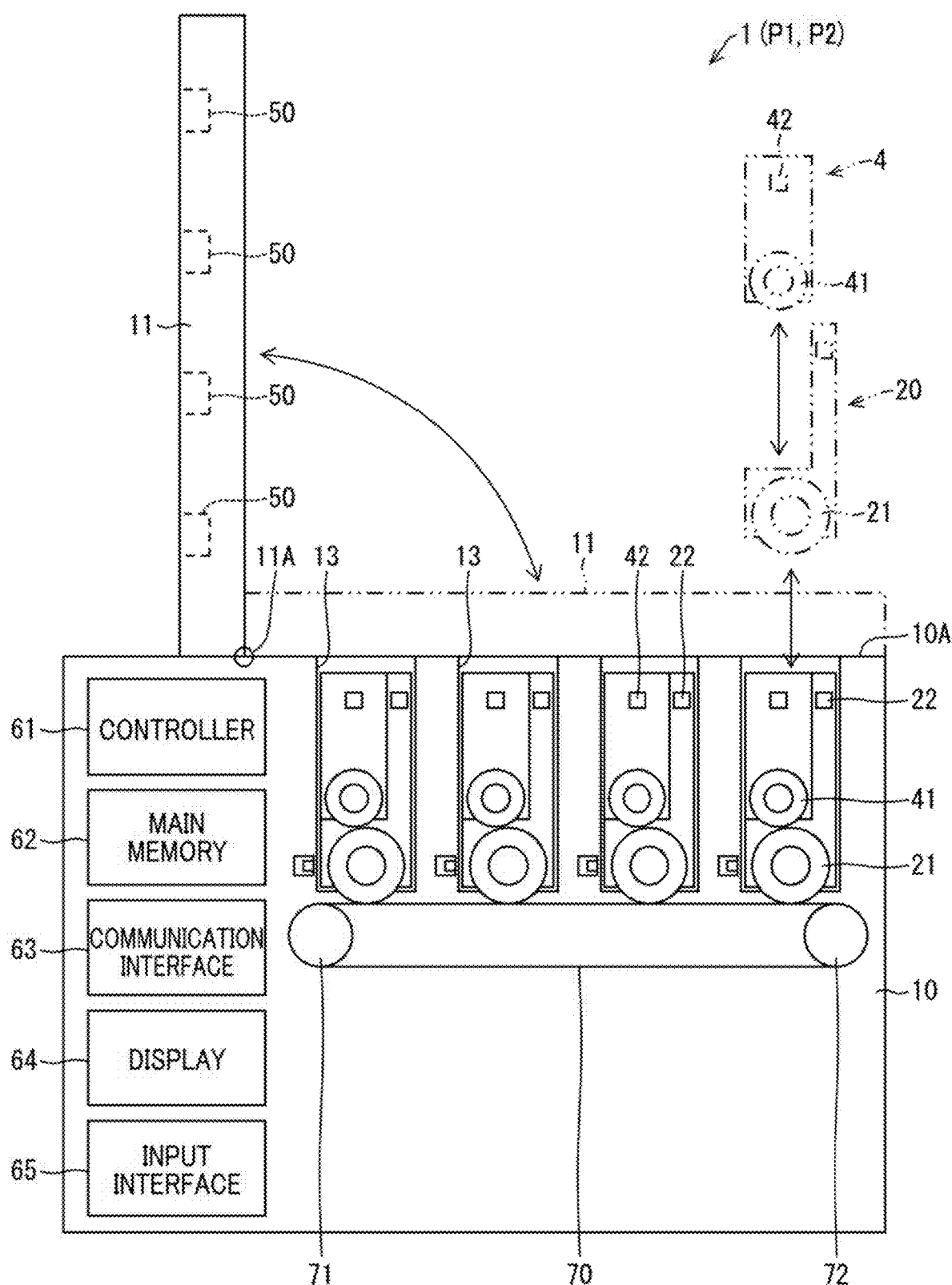
FIG. 2 is a schematic diagram illustrating an example of image processing devices.
Figure 3:
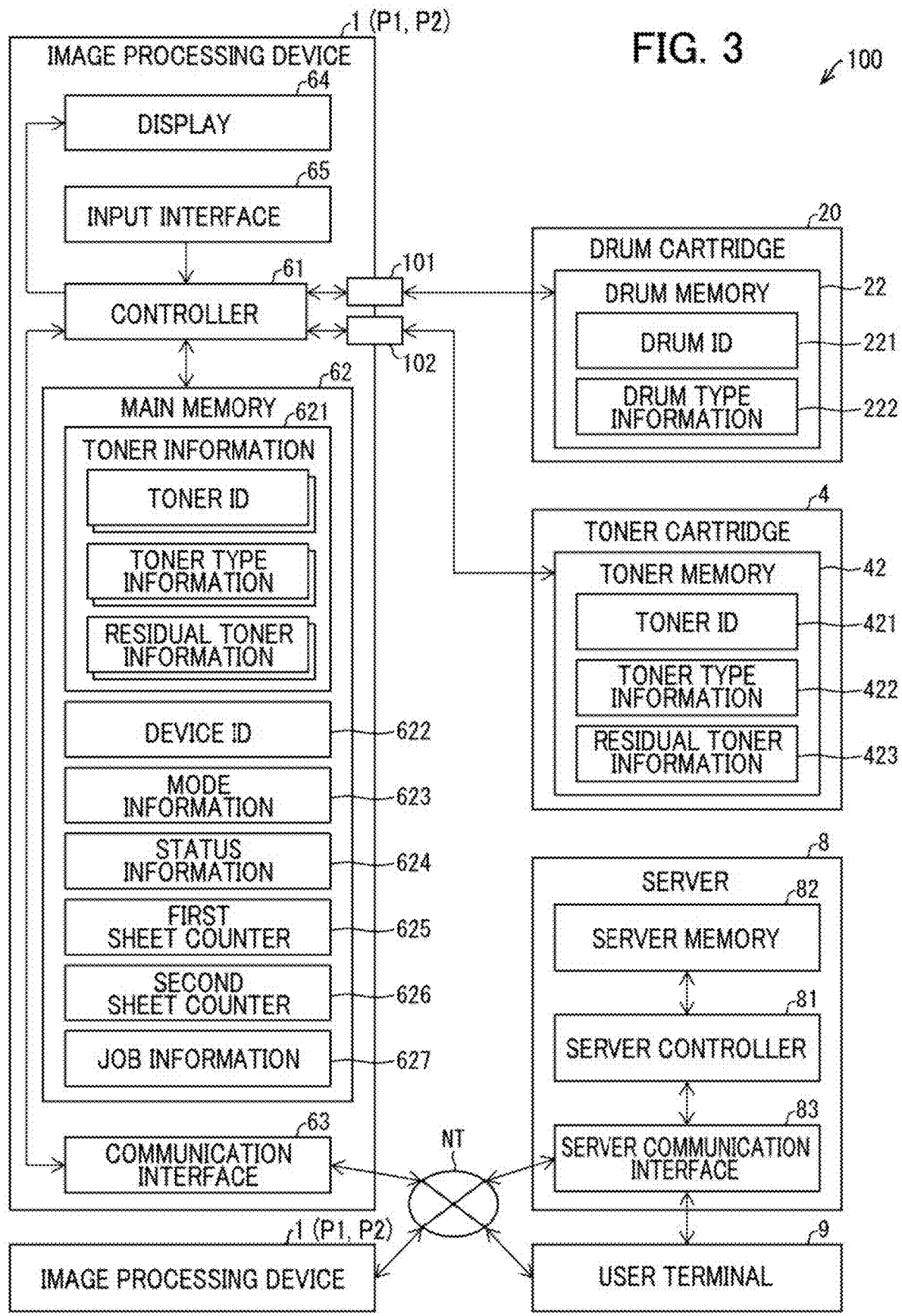
FIG. 3 is a block diagram illustrating relationships of connections among examples of image processing devices having drum cartridges and toner cartridges, a server, and a user terminal.

FIG. 2 is a schematic diagram of the image processing device 1. FIG. 3 shows the relationships of connections among the image processing devices 1 including their drum cartridges 20 and toner cartridges 4; the server 8; and the user terminal 9. While the image processing system 100 in the example of FIG. 3 includes two image processing devices 1, both image processing devices 1 have the same configuration.

As shown in FIG. 2, each image processing device 1 includes a main casing 10, a cover 11, toner cartridges 4, drum cartridges 20, a controller 61, a main memory 62, a communication interface 63, a display 64, and an input interface 65.

Main Casing 10

The toner cartridges 4 are mountable in the main casing 10 of the image processing device 1. As will be described later in detail, each toner cartridge 4 is mounted in a drum cartridge 20 to form an integral unit with the drum cartridge 20. While mounted in the corresponding drum cartridge 20, each toner cartridge 4 can then be mounted together with the corresponding drum cartridge 20 into the main casing 10, thereby achieving the image processing device 1 that includes the drum cartridges 20 and the toner cartridges 4.

Note that four toner cartridges 4 can be mounted in the image processing device 1 of the present embodiment in order to perform printing. In other words, the image processing device 1 according to the present embodiment is configured to accept four mounted drum cartridges 20 and four mounted toner cartridges 4. However, the numbers of drum cartridges 20 and toner cartridges 4 mounted in the image processing device 1 are not limited to the example of FIG. 2. For example, the image processing device 1 may be a monochrome printer that allows the mounting of a single drum cartridge 20 and a single toner cartridge 4.

Each toner cartridge 4 accommodates toner that is consumed when the image processing device 1 perform printing. In other words, for the image processing device 1, the toner cartridge 4 is an example of the consumable. Further, each drum cartridge 20 includes a photosensitive drum 21 that is used for printing on the image processing device 1. For the image processing device 1, the drum cartridge 20 is an example of the consumable.

The main casing 10 has a rectangular box shape, for example. The main casing 10 is configured to accommodate the four drum cartridges 20, the four toner cartridges 4, a transfer belt 70, the controller 61, the main memory 62, and the communication interface 63. The main casing 10 also has four cartridge retaining members (cartridge holders) 13. The cartridge retaining members 13 are formed as recesses that are open in the main casing 10. The drum cartridges 20 and toner cartridges 4 are retained in corresponding cartridge retaining members 13 when mounted in the main casing 10.

Cover 11

The cover 11 of the image processing device 1 is provided with a light source unit 50 for each of the drum cartridges 20. Thus, the image processing device 1 is provided with four light source units 50. The cover 11 can rotate (move) about a rotational shaft 11A between an open position depicted with solid lines in FIG. 2 for exposing an opening 10A, and a closed position depicted with two-dot chain lines in FIG. 2 for covering the opening 10A. The rotational shaft 11A extends in a first direction. Hence, the opening 10A formed in the top of the main casing 10 is opened and closed by the rotation of the cover 11.

Note that the "first direction" denotes a direction extending along the rotational axis of a developing roller 41 in the toner cartridge 4 (the developing roller axis). The openings of the cartridge retaining members 13 are exposed when the cover 11 is in the open position and are covered by the cover 11 when the cover 11 is in the closed position.

A cover sensor (not shown) is provided in the opening 10A. The cover sensor detects when the cover 11 is in the closed position. The cover sensor may be a contact-type sensor or an optical sensor, for example.

Toner Cartridges 4

Each toner cartridge 4 has a developing roller 41, and a cartridge case that can accommodate developer (e.g., toner). The cartridge case is mountable in the main casing 10. The four toner cartridges 4 accommodate developer in mutually different colors (e.g., the colors cyan, magenta, yellow, and black) as the material used for an image process such as an image forming process. The developer is an example of the printing material.

The developer is a consumable that becomes depleted during use. The developing roller 41 is a cylindrical member that extends in the first direction and is rotatable about the developing roller axis extending in the first direction. When the toner cartridge 4 is mounted in the drum cartridge 20, the outer circumferential surface of the photosensitive drum 21 contacts the outer circumferential surface of the developing roller 41.

The toner cartridge 4 also has a toner memory 42 as an example of the consumable memory or the memory of the consumable. The toner cartridge 4 has the outer surface and the toner memory 42 is disposed on a part of the outer surface which is on one side (upstream side or downstream side) of the toner cartridge 4 in the first direction. The toner memory 42 allows the reading and writing of information. For example, the toner memory 42 may be flash read-only memory (flash ROM) or electrically erasable programmable read-only memory (EEPROM; Japanese registered trademark of Renesas Electronics Corporation).

The toner memory 42 has a first area 421, a second area 422, and a third area 423 for storing information related to the toner cartridge 4. The toner memory 42 stores a toner ID in the first area 421. The toner memory 42 stores toner type information in the second area 422. The toner memory 42 stores residual toner information in the third area 423. Note that data in the third area 423 is overwritable.

The toner ID specifies unique information for identifying an individual toner cartridge 4. Here, the toner ID is a unique serial number for an individual toner cartridge 4. The toner ID may include information specifying the color of the toner cartridge 4.

The toner type information is an example of the type information specifying the type of the toner cartridge 4. There are two types of toner cartridges 4 in the present embodiment. The first type is a "special cartridge" that can be used only on a subject of the agreement (a subscribed device). In other words, a special cartridge is an example of a special consumable that can be used when the user has concluded an agreement for the image processing device 1.

The second type is a "normal cartridge" that can be used on any image processing device 1, including image processing devices 1 that are not subjects of the agreement (subscribed devices). In other words, the normal cartridge is an example of a normal consumable that can be used in the image forming devices regardless of whether an agreement has been entered for the image forming devices. Note that the toner type information may also be included in the toner ID. That is, the toner ID may simultaneously be information identifying an individual toner cartridge 4 and information specifying the type of the toner cartridge 4.

The residual toner information indicates the residual quantity of toner in the toner cartridge 4. In this example, the residual quantity of toner is a value associated with one of a plurality of levels from full to empty. This value is stored in the third area 423. The residual quantity level of toner stored in the toner memory 42 may be a character string such as "FULL", "HIGH", "LOW", "EMPTY", and the like; may be a numerical value such as a value from "100%" to "0%"; or may be information combining a character string with a numerical value.

Drum Cartridges 20

Each drum cartridge 20 has a cartridge case that is mountable in the main casing 10. The cartridge case includes a photosensitive drum 21 as a component used for an image process. As the photosensitive drum 21 is used, the surface of the photosensitive drum 21 wears or otherwise degrades, requiring the photosensitive drum 21 to be replaced. That is, the photosensitive drum 21 is a consumable. The photosensitive drum 21 is a cylindrical photosensitive member extending in the first direction. The photosensitive drum 21 can rotate about a drum roller shaft extending in the first direction. The outer circumferential surface of the photosensitive drum 21 is covered by a photosensitive material.

The drum cartridge 20 also has a drum memory 22 as an example of the consumable memory or the memory of the consumable. The drum memory 22 allows the reading and writing of information. The drum memory 22 is flash ROM or EEPROM, for example.

The drum memory 22 has a first area 221 and a second area 222 which are for storing information related to the photosensitive drum 21 of the drum cartridge 20. The drum memory 22 stores a drum ID in the first area 221. The drum memory 22 stores drum type information in the second area 222.

The drum ID represents unique information for identifying an individual drum cartridge 20. The drum ID is a unique serial number identifying a single drum cartridge 20 in this example. The drum type information is an example of type information specifying the type of the drum cartridge 20. There are two types of drum cartridges 20 in the present embodiment: a "special cartridge" and a "normal cartridge." The drum type information may also be included in the drum ID. That is, the drum ID may simultaneously be information identifying an individual drum cartridge 20 and information specifying the type of the drum cartridge 20.

Mounting of Cartridges and the Printing Mechanism

As shown in FIG. 2, the drum cartridges 20 and toner cartridges 4 are mounted in the main casing 10 while the cover 11 is in the open position. In this state, the drum cartridges 20 and toner cartridges 4 are inserted through the opening 10A into the corresponding cartridge retaining members 13.

The main casing 10 also has four connectors 101 and four connectors 102. The four connectors 101 respectively correspond to the four drum cartridges 20 and the four connectors 102 respectively correspond to the four toner cartridges 4. When the drum cartridge 20 is inserted into the corresponding cartridge retaining member 13, the corresponding connector 101 becomes electrically connected to the drum memory 22 of the inserted drum cartridge 20, enabling the controller 61 to communicate with the drum memory 22. Further, while the toner cartridge 4 is mounted in the main casing 10, the connector 102 is electrically connected to the toner memory 42 of the toner cartridge 4 mounted in the main casing 10, enabling the controller 61 to communicate with the toner memory 42 of the toner cartridge 4.

The four light source units 50 are mounted on the inner surface of the cover 11. The light source units 50 are arranged to confront the top surfaces of the photosensitive drums 21 when the drum cartridges 20 are mounted in the main casing 10 and the cover 11 is in the closed position. Each light source unit 50 has a plurality of light sources aligned in the first direction. The light sources can irradiate light onto the outer circumferential surface of the corresponding photosensitive drum 21. The light sources are light-emitting diodes (LEDs), for example.

Each light source unit 50 is electrically connected to the controller 61. The controller 61 controls the light sources of each light source unit 50 to emit light based on inputted image data. The light sources irradiate light toward the outer circumferential surfaces of the photosensitive drums 21. As a result, the photosensitive material on the outer circumferential surfaces of the photosensitive drums 21 is exposed according to the image data.

The transfer belt 70 is a component that transfers developer present on the surfaces of the photosensitive drums 21 onto a printing paper. As the transfer belt 70 is used, the surface of the transfer belt 70 wears or otherwise degrades, where by the transfer belt 70 is required to be replaced. That is, the transfer belt 70 is a consumable. The transfer belt 70 is a belt having an annular shape (an endless belt). The outer circumferential surfaces of the photosensitive drums 21 can contact the outer surface of the transfer belt 70. During a printing process, printing paper is conveyed between the transfer belt 70 and the photosensitive drums 21.

The transfer belt 70 is stretched around a drive roller 71 and a follow roller 72. The drive roller 71 drives the transfer belt 70 to circulate. The controller 61 controls the drive roller 71 to rotate. The follow roller 72 rotates along with the movement of the transfer belt 70 driven by the drive roller 71.

Internal Structure of the Main Casing 10

The controller 61 has an application-specific integrated circuit (ASIC), for example. The controller 61 is electrically connected to the main memory 62, the communication interface 63, the display 64, and the input interface 65 provided in the main casing 10. The controller 61 executes various processes for controlling the image processing device 1 to perform a printing process and related processes.

The controller 61 may also be provided with a processor, such as a central processing unit (CPU). In this case, a control program for implementing a print control method may be stored in the main memory 62. A printing process on the image processing device 1 may be executed by the processor of the controller 61 performing operations according to the control program stored in the main memory 62.

The controller 61 itself may also be provided with a computer-readable storage medium that stores the control program. The storage medium may be a "non-transitory, tangible medium," such as read-only memory (ROM), a tape, a disc, a card, semiconductor memory, or a programmable logic circuit. Random-access memory (RAM) or the like may also be used for developing the control program.

The control program may also be supplied to the computer via any transmission medium (a communication network, broadcast waves, etc.) capable of transmitting the control program. Note that one aspect of this disclosure is that the control program can be implemented in the form of data signals embedded in a carrier wave, as embodied in electronic transmission.

When the drum cartridge 20 and toner cartridge 4 are mounted in the corresponding cartridge retaining member 13 of the main casing 10, the drum memory 22 and toner memory 42 are electrically connected to the controller 61, as illustrated in FIG. 3. The controller 61 can execute a read process for reading information from the connected drum memory 22 and/or toner memory 42, and a write process and/or an overwrite process for writing or overwriting information to the drum memory 22 and/or toner memory 42.

The main memory 62 allows the reading and/or writing of information. The main memory 62 may be a nonvolatile memory, volatile memory, or a combination of the nonvolatile memory and volatile memory. That is, the main memory is RAM, flash ROM, EEPROM, or non-volatile random-access memory (NVRAM), for example. The main memory 62 has a first area 621 that stores toner information, a second area 622 that stores a device ID, a third area 623 that stores mode information, a fourth area 624 that stores status information, a fifth area 625 that stores a first sheet counter, a sixth area 626 that stores a second sheet counter, and a seventh area 627 that stores job information.

The toner information is information related to each toner cartridge 4 mounted in the image processing device 1. For example, the toner information may be data associating a toner ID read from a certain toner memory 42 with toner type information and residual toner information read from the same toner memory 42. The main memory 62 may store this associated data in the first area 621 for each toner cartridge 4. The device ID is an example of unique identification information for identifying the individual image processing device 1. The device ID may be a unique serial number for the image processing device 1.

The mode information indicates the operating mode of the image processing device 1. In the present embodiment, the mode information indicates one of two modes: a "subscription mode" specifying that the image processing device 1 is currently registered as a subject of the agreement (a subscribed device), and a "normal mode" specifying that the image processing device 1 is not currently registered as a subject of the agreement (not the subscribed device) or that the agreement for the image processing device 1 has been cancelled.

In other words, "subscription mode" specifies that the image processing device 1 operates in the image processing system 100 as a subject of the agreement (a subscribed device under the agreement). "Normal mode" specifies that the image processing device 1 is not a subject of the agreement (not a subscribed device) and operates as a normal image processing device having no agreement or contract. When the image processing device 1 is shipped, the storage area 623 stores a value corresponding to the normal mode as a default value. The controller 61 overwrites the mode information as needed.

The status information represents the current status of the image processing device 1. For example, the status information in the present embodiment indicates whether the image processing device 1 is in the (1) normal mode, (2) a non-billing state under the subscription mode, (3) a billing state under the subscription mode, (4) a printing suspended state under the subscription mode, or (5) a printing restricted state under the subscription mode.

The "non-billing state under the subscription mode" denotes a state in which the image processing device 1 is in the subscription mode but use of the subscription mode has not yet begun. For example, this non-billing state under the subscription mode can occur in a case that the timing at which the server 8 recognizes the image processing device 1 as a subject of the agreement (or as a subscribed machine) differs from the timing at which the server 8 considers usage of the subscription service to have begun on the image processing device 1. The billing state under the subscription mode denotes a state in which the image processing device 1 is in the subscription mode and use of the subscription mode has started.

The first sheet counter indicates the cumulative number of sheets printed on the image processing device 1. The second sheet counter indicates the number of sheets that have been printed by the image processing device 1 in subscription printing. The count of the second sheet counter may be reset to 0 each time the image processing device 1 transitions from the subscription mode to the normal mode or may indicate the cumulative number of sheets that have been printed to date on the image processing device 1 under an agreement.

Job information specifies one or more jobs related to corresponding image processes. That is, each job is to execute the corresponding image process. The job related to the image process may be a print job instructing the image processing device 1 to print, for example. The controller 61 acquires one or more print jobs from the user terminal 9 via the network NT. The controller 61 stores acquired one or more print jobs in the seventh area 627 of the main memory 62.

The image processing device 1 can perform printing based on print data specified by a print job on a print sheet by controlling the various components of the image processing device 1. Specifically, the controller 61 controls the image processing device 1 to perform a printing process and processes related to the printing process by executing various processes based on the print job. Alternatively, the job information may be information for specifying one or more jobs, such as job IDs assigned to corresponding jobs each related to an image process. In this case, jobs related to the image processes may be stored on the server 8 or the like.

The communication interface 63 is an interface that conducts communications between the image processing device 1 and the server 8 via the network NT. The communication interface 63 outputs various data, notifications, and requests received from the server 8 to the controller 61. The communication interface 63 also transmits various data, notifications, and requests inputted from the controller 61 to the server 8. That is, the communication interface 63 may be an inter-device interface, or data transferring interface enabling the controller 61 to be connected to other devices, or a network interface.

The display 64 is a liquid crystal display, for example, that displays various information. The input interface 65 includes buttons and the like by which the user inputs various information. The display 64 and the input interface 65 may also be integrally configured of a liquid crystal display and a touchscreen, for example.

User Terminal 9

The user terminal 9 has an input interface for receiving various input operations performed by the user, and a communication interface for communicating with the server 8. The user registers a subscribed device on the server 8 through input operations performed on the user terminal 9. For example, the user inputs the user's own piece of identification information (the user identification information or the user ID) and the piece of identification information (the device ID) for the image processing device 1 that the user wishes to register as a subscribed device into the user terminal 9. Upon receiving this input, the user terminal 9 sends to the server 8 the inputted the user's own piece of identification information (the user ID) and the inputted piece of identification information (the device ID) for the image processing device 1.

In addition to input operations for registering a subscribed device (or, for adding a subscribed device), the user terminal 9 may receive input operations for replacing a subscribed device. For example, the user terminal 9 may receive input operations performed by the user to input the user's own piece of identification information (the user ID), the piece of identification information (the device ID) for the new subscribed device, and the piece of identification information for the current subscribed device. Subsequently, the user terminal 9 may send these three pieces of information to the server 8.

Server 8

The server 8 is a management device that manages the operating status of image forming devices 1 and that enables the transactions between the user and the service provider. The server 8 is provided with a server communication interface 83, a server memory 82, and a server controller 81. The server controller 81 has a processor that performs overall control of the server 8 such as a central processing unit (CPU). The server memory 82 is a storage that stores data required for the operations of the server 8.

The server memory 82 may have an area that stores device information, and an area that stores a registration table. The server controller 81 may store device information or update the registration table in response to notifications or requests received from image processing devices 1 or the user terminal 9.

Device information is data compiling various information about an image processing device 1. The device information is stored separately for each image processing device 1 that the server 8 manages. Device information includes a device ID for each image processing device 1 that the server 8 manages. The registration table is a data table registering image processing devices 1 that have been designated subscribed machines by users. The registration table has data indicating whether the subscribed machine is currently active. The server memory 82 stores a list of device IDs each identifying an image processing device 1 to be replaced with another image processing device 1 currently used.

The server communication interface 83 is a communication interface that enables the server 8 to communicate with image processing devices 1 and the user terminal 9 via the network NT. That is, the server communication interface 83 may be an inter-device interface, or data transferring interface enabling the server controller 81 to be connected to other devices, or a network interface. The server communication interface 83 outputs various data, notifications, and requests received from image processing devices 1 or the user terminal 9 to the server controller 81. The server communication interface 83 also sends various data, notifications, and requests inputted from the server controller 81 to image processing devices 1 or the user terminal 9.

Transitioning from an Old Device to a New Device

Hereinafter, the image processing device 1 that the user currently uses will be called the first image processing device P1 or the printer P1. The first image processing device P1 has a subscription mode that the first image processing device P1 is currently registered as a subject of the agreement (a subscribed device) on the server 8 according to operation or instruction by the user, and a normal mode indicating that the first image processing device P1 is not currently registered as a subject of the agreement on the server 8 according to operation or instruction by the user or that the subscription for the image processing device 1 has been canceled according to operation or instruction by the user. In the following description, an ordinal numeral "first" may be added components in the first image processing device P1. For example, the controller 61, the main memory 62, the communication interface 63, the input interface 65, and the display 64 in the first image processing device P1 may be described respectively as the first controller 61, the first main memory 62, the first communication interface 63, the first input interface 65, and the first display 64. That is, the first image processing device P1 includes the first controller 61, the first main memory 62, the first communication interface 63, the first input interface 65, and the first display 64. The first image processing device P1 is provided for the user by the service provider.

Further, the image processing device 1 that the user intends to use in place of the first image processing device P1 will be called the second image processing device P2 or the printer P2. The second image processing device P2 also has a subscription mode indicating that the second image processing device P2 is currently registered as a subject of the agreement (a subscribed device) on the server 8 according to operation or instruction by the user and a normal mode indicating the second image processing device P2 not registered as a subject of the agreement on the server 8 according to operation or instruction by the user or whose agreement 1 has been canceled according to operation or instruction by the user. In the following description, an ordinal numeral "second" may be added components in the second image processing device P2. For example, the controller 61, the main memory 62, the communication interface 63, the input interface 65, and the display 64 in the second image processing device P2 may be described as the second controller 61, the second main memory 62, the second communication interface 63, the second input interface 65, and the second display 64. That is, the second image processing device P2 includes the second controller 61, the second main memory 62, the second communication interface 63, the second input interface 65, and the second display 64. The second image processing device P2 is to be provided for the user by the service provider. The server 8 manages the first image processing device P1 as the subject device of the agreement and also manages the second image processing device P2 to replace the first image processing device P2 and to be the subject device of the agreement.

Data Processing Method on the Image Processing System 100

Figure 4:
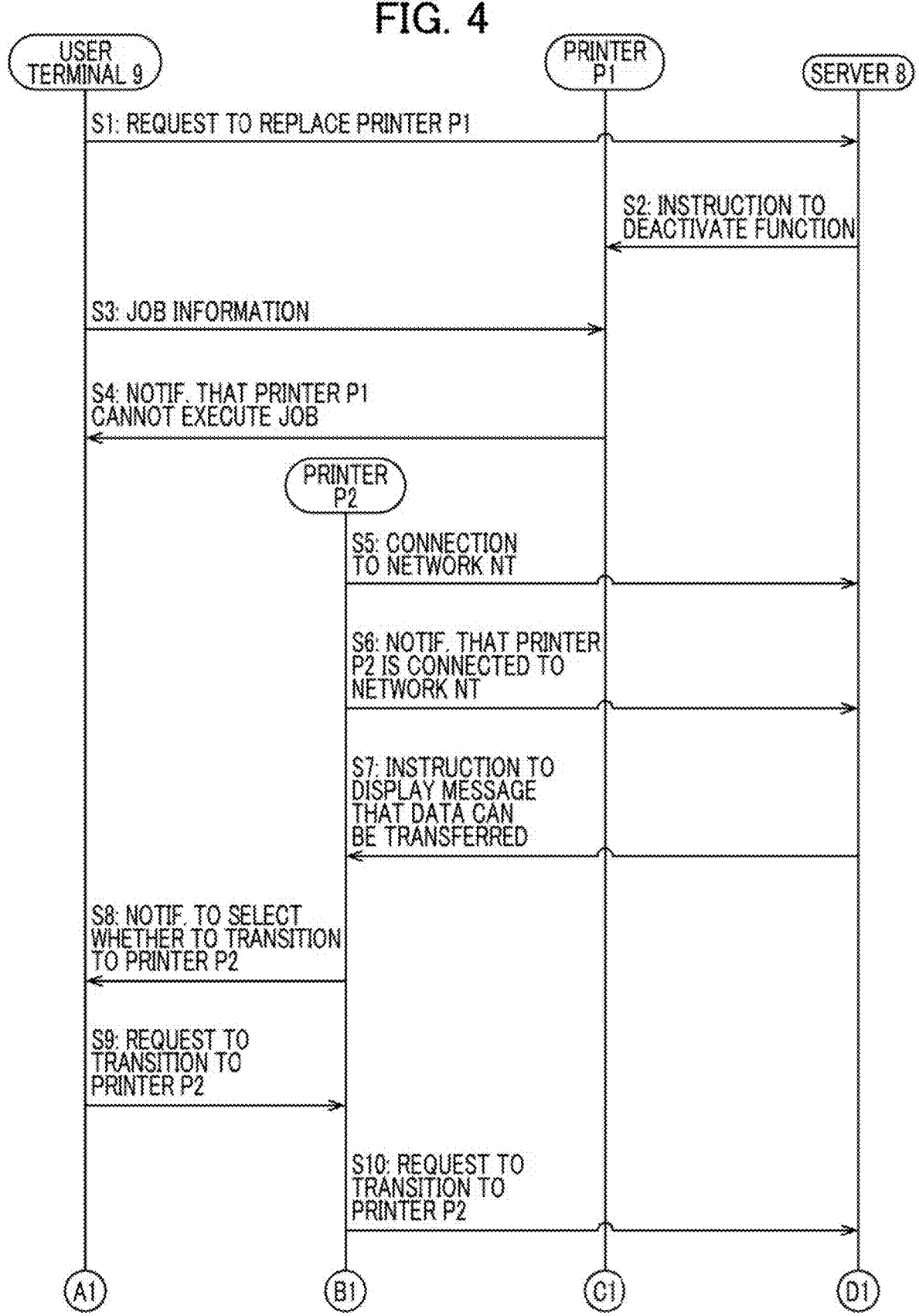
FIG. 4 is a sequence diagram illustrating operations of devices in the image processing system.
Figure 5:
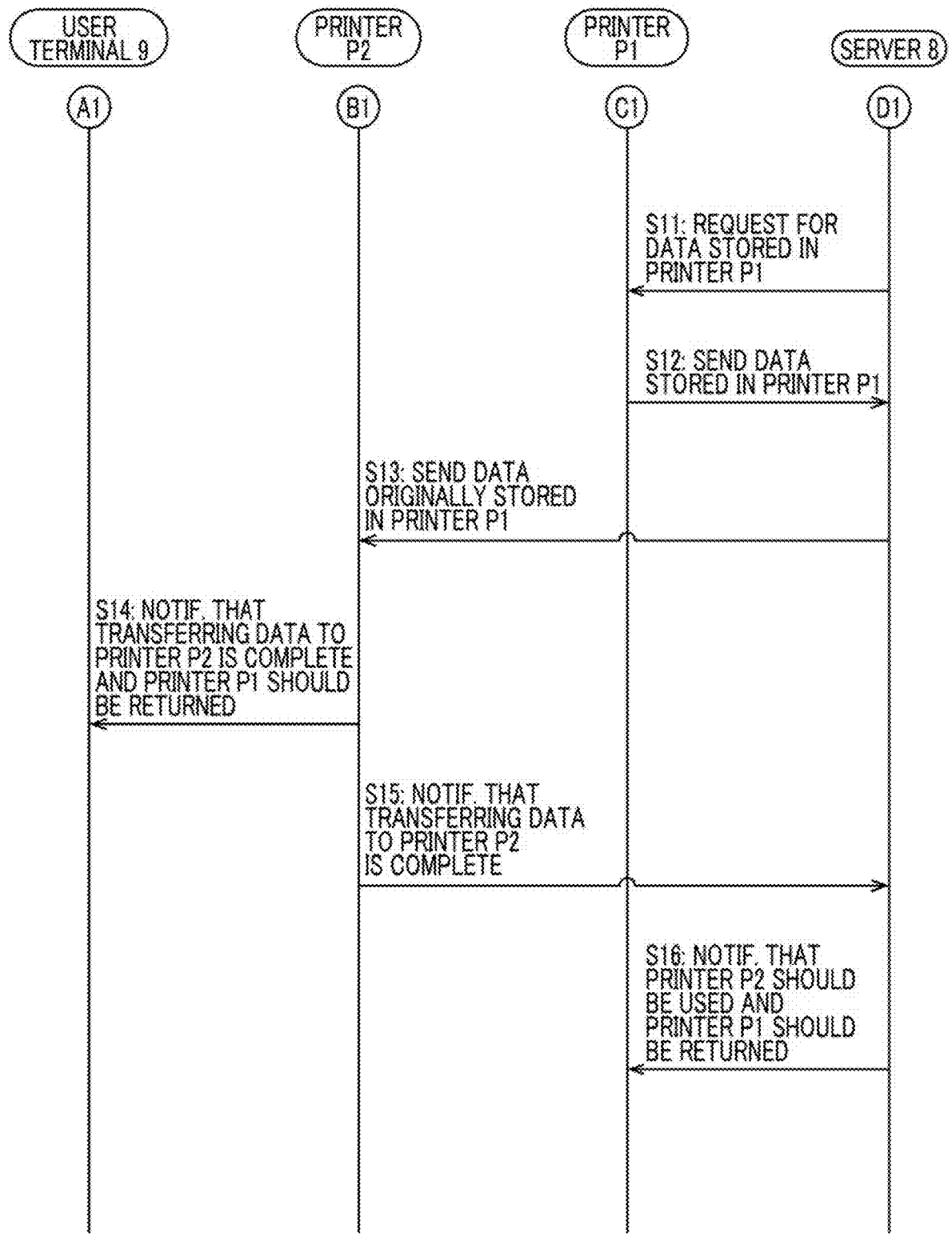
FIG. 5 is a sequence diagram illustrating operations of devices in the image processing system following the operations illustrated in FIG. 4.

FIG. 4 is a sequence chart showing an example of operations performed by the various devices in the image processing system 100. FIG. 5 is a sequence chart showing a continuation of the operations in FIG. 4. FIGS. 4 and 5 describe operations performed when the user transitions from the first image processing device P1 to the second image processing device P2. The server 8 manages both the first image processing device P1 and the image processing device P2. The server memory 82 of the server 8 stores user identification information for identifying the user, the device ID of the first image processing device P1, and the device ID of the second image processing device P2 in an associated state. Further, the process of FIG. 4 starts in a state that the server memory 82 stores information indicating that the first image processing device P1 is in use.

The user of the first image processing device P1 performs input operations on the user terminal 9 to arrange for the replacement and return of the first image processing device P1. Upon receiving the input operations, in S1 shown in FIG. 4 the user terminal 9 sends a request to replace the first image processing device P1 to the server 8. The server controller 81 of the server 8 receives the request to replace the first image processing device P1 from the user terminal 9. The process in which the server controller 81 receives the request to replace the first image processing device P1 is an example of the process ore step of receiving.

When the server controller 81 of the server 8 receives the request to replace the first image processing device P1 from the user terminal 9, in S2 the server controller 81 instructs the first image processing device P1 to deactivate prescribed functions. For example, in S2 the server controller 81 sends an instruction to the first image processing device P1 to deactivate prescribed functions required for executing image processes such as printing on printing paper. The instruction may be to instruct one prescribed function. Deactivating prescribed functions on the first image processing device P1 required for executing image processes prevents the user from using the first image processing device P1 to execute those image processes. Consequently, the user can be encouraged to transition from the first image processing device P1 to the second image processing device P2. The process receiving the request to replace the first image processing device P1 is an example of the process or step of receiving. When the server controller 81 receives the request, in S2 the server controller 81 may include the device ID of the second image processing device P2 to replace the first image processing device P1 in the list of the device ID. In S2, the service controller 81 as the service provider may arrange for the second image processing device P2 to be sent to the address of the user of the first image processing device P1.

Note that when instructing the first image processing device P1 to deactivate prescribed functions in S2, the server controller 81 may also send to the first image processing device P1 a request for data stored in the main memory 62 of the first image processing device P1 and receive the data from the first image processing device P1 as a response. After completing the process in S2, the server controller 81 overwrites, in the server memory 82, the information indicating that the first image processing device P1 is in use with information indicating that the prescribed functions of the first image processing device P1 have been deactivated. At the time that the server controller 81 executes the process in S2, the server memory 82 holds information indicating that the second image processing device P2 has not yet been used and is not connected to the network NT.

The first controller 61 of the first image processing device P1 receives the instruction to deactivate the prescribed functions from the server controller 81. After receiving the instruction to deactivate the prescribed functions, the first controller 61 deactivates the prescribed functions of the first image processing device P1. When the instruction is to deactivate one prescribed function, the first controller may deactivate the prescribed function of the first image processing device P1. For example, in a case that the first controller 61 receives the instruction to deactivate the prescribed functions, the first controller 61 deactivates the functions required to execute image processes. The first controller 61 may send to the server controller 81 a notification indicating that the prescribed functions have been deactivated, and thus the server controller 81 may receive this notification from the first image processing device P1 and thereafter overwrite, in the server memory 82, the information indicating that the first image processing device P1 is in use with information indicating that the prescribed functions of the first image processing device P1 have been deactivated.

In S3 the user terminal 9 sends job information to the first image processing device P1 after the process of S2 is completed. In a case that the first image processing device P1 receives the job information from the user terminal 9 after having deactivated the prescribed functions, the first controller 61 of the first image processing device P1 stores the job information in the main memory 62 of the first image processing device P1. The process in which the first controller 61 stores the job information in the second main memory 62 is an example of the process or step of storing (or the second process or step). The first controller 61 may store the job information in the main memory 62 which is volatile memory, nonvolatile memory, or the combination of the volatile memory and the nonvolatile memory.

In this case, in S4 the first controller 61 of the first image processing device P1 sends to the user terminal 9 a notification indicating that the first image processing device P1 cannot execute the image processing job. After receiving this notification from the first image processing device P1, the user terminal 9 displays a message on the screen of the user terminal 9 indicating that the first image processing device P1 cannot execute the image processing job.

In S4 the first controller 61 of the first image processing device P1 may also notify the user terminal 9 that the first image processing device P1 must be replaced in order to execute the job related to the image process. The first controller 61 may also notify the user terminal 9 in S4 that a transition from the first image processing device P1 to the second image processing device P2 as a replacement device can be performed once the second image processing device P2 is connected to and in communication with the server 8. This notification can encourage the user to connect the second image processing device P2 to the server 8.

Next, in S5 the user connects the second image processing device P2 to the server 8 by connecting the second image processing device P2 to the network NT. Through this connection, the server communication interface 83 of the server 8 can be connected to and communicate with the second controller 61 of the second image processing device P2. The process in which the server communication interface 83 is connected to and communicates with the second controller 61 of the second image processing device P2 is an example of the process or step of connecting. After connecting to the server communication interface 83, in S6 the second controller 61 of the second image processing device P2 sends to the server controller 81 a notification indicating that the second image processing device P2 is connected to and in communication with the network NT.

Following the process of S6, the server controller 81 overwrites the information in the server memory 82 indicating that the second image processing device P2 is not connected to the network NT with information indicating that the second image processing device P2 is connected to the network NT.

In S7 the server controller 81 also send to the second image processing device P2 an instruction to display a message indicating that data stored in the main memory 62 of the first image processing device P1 can be transferred as data originally stored in the first image processing device P1 to the second image processing device P2. Upon receiving this instruction from the server controller 81, the second controller 61 of the second image processing device P2 displays a message on the display 64 of the second image processing device P2 indicating that data stored in the first image processing device P1, as the data originally stored in the first image processing device P1, can be transferred from the first image processing device P1 to the second image processing device P2. In S8 the second controller 61 of the second image processing device P2 also sends to the user terminal 9 a notification to request the user to select whether to transition to the second image processing device P2. In S7 the server controller 81 may also send to the user terminal 9 an instruction to display the same message indicating that data stored in the main memory 62 of the first image processing device P1 as the data originally stored in the first image processing device P1 can be transferred when the first image processing device P1 is brought online.

The user of the first image processing device P1 performs input operations on the user terminal 9 for selecting the option to transition to the second image processing device P2. When receiving the input operations in this case, in S9 the user terminal 9 sends, to the second image processing device P2, a request to transition from the first image processing device P1 to the second image processing device P2. Upon receiving the request to transition from the user terminal 9, in S10 the second controller 61 of the second image processing device P2 sends a request to the server 8 to transition from the first image processing device P1 to the second image processing device P2.

In S10 the second controller 61 of the second image processing device P2 may also execute an inquiry process. In the inquiry process, the second controller 61, having connected to the server 8 in S5, queries the server 8 whether the second image processing device P2 is to acquire data stored in the first image processing device P1, as the data originally stored in the first image processing device P1, from the server 8. In the inquiry process, the second controller 61 connected to the server 8 may query the server 8 whether there is data stored in the first image processing device P1 that the second image processing device P2 can acquire as the data originally stored in the first image processing device P1.

Upon receiving the request to transition from the first image processing device P1 to the second image processing device P2, in S11 as illustrated in FIG. 5 the server controller 81 sends to the first image processing device P1 a request for the data stored in the first main memory 62 of the first image processing device P1. Upon receiving this request for data stored in the first image processing device P1, in S12 the first controller 61 of the first image processing device P1 sends data stored in the main memory 62 of the first image processing device P1, as the data originally stored in the first image processing device P1, to the server 8. After sending the data to the server 8, the first controller 61 of the first image processing device P1 may delete the sent data stored in the main memory 62 of the first image processing device P1 from the first main memory 62.

The server controller 81 acquires the data stored in the first image processing device P1 that was sent from the first image processing device P1 and stores this acquired data in the server memory 82 as the data originally stored in the first image processing device P1. The process in which the server controller 81 stores the data originally stored in the first image processing device P1 in the server memory 82 is an example of the process or step of storing and an example of storing step or process (or the first storing process or step).

The data originally stored in the first image processing device P1 acquired by the server controller 81 in S12 may include the toner information, the device ID, the mode information, the status information, the first sheet counter, the second sheet counter, and the job information that were stored in the first main memory 62 of the first image processing device P1, for example. In other words, the data originally stored in the first image processing device P1 acquired by the server controller 81 in S12 includes at least settings information for the first image processing device P1. Here, the settings information for the first image processing device P1 includes the mode information, status information, first sheet counter, and second sheet counter stored in the main memory 62 of the first image processing device P1. The settings information may include printed amounts of printed resources used under the agreement and/or remaining amounts of printable resources which can be used according to the agreement. Here, the printed resources are print medium, and consumables such as toner and drums that have been used in the printing. Thus, the amounts of printed resources may include the number of printed medium (number of printed sheets, for example), the amount of used toner, and the rotated number of drum. The printable resources are print medium and consumables such as toner and drums that are usable in the future printing. Thus, the amounts of printable resources may include the number of printable medium (the number of printable sheets), the amount of usable toner, and the remaining rotation number of drum that can be rotated. The settings information may include default settings of printer having a printing resolution, a printing density, and information whether to perform a color printing or monochrome printing.

As described above, the data originally stored in the first image processing device P1 acquired by the server controller 81 in S12 may include job information. Therefore, the server controller 81 acquires any job information included in the data originally stored in the first image processing device P1 stored in the first main memory 62 of the first image processing device P1 and stores this job information in the server memory 82.

In S13 the server controller 81 sends the data acquired from the first image processing device P1, as the data originally stored in the first image processing device P1, to the second image processing device P2. Thus, under a condition that a request to replace the first image processing device P1 has been received in S1 and in S2 the server controller 81 has instructed the first image processing device P1 to deactivate the prescribed functions, in S13 the server controller 81 sends the data originally stored in the first image processing device P1 to the second image processing device P2. The process of S13 is an example of the process or step of sending. In other words, in a case a prescribed condition is satisfied, the server controller 8 sends the data originally stored in the image processing device P1 to the second image processing device P2. Here, for satisfying the prescribed condition, satisfying a condition that a prescribed function (at least one prescribed function) of the first image processing device P1 has been deactivated on the basis of the request received by the server 8 is necessary. In the present embodiment, the prescribed condition may be satisfied when the condition that the prescribed function of the first image processing device P1 has been deactivated on the basis of the request received by the server 8 is satisfied. Or, the prescribed condition may be satisfied when the condition that all the prescribed functions of the first image processing device P1 have been deactivated on the basis of the request received by the server 8 is satisfied. Thus, in a state that a prescribed function of the first image processing device P1 has been deactivated upon reception of the request by the server 8, the first controller 61 acquires from the server 8 the data originally stored in the first image processing device P1. In S13 the server controller 81 may send to the first image processing device P1 an instruction to acquire the data originally stored in the first image processing device P1, as a response to the inquiry sent through the inquiry process of S10, before transmission of the data originally stored in the first image processing device P1 to the second image processing device P2. In other words, the second image processing device P2 acquires the data originally stored in the first image processing device P1 after the second controller 61 has received the instruction to acquire the data originally stored in the first image processing device P1.

In the process to store in the server memory 82 the data originally stored in the first image processing device P1, the server controller 81 acquires the data while the prescribed functions of the first image processing device P1 have been deactivated. Deactivating the prescribed functions of the first image processing device P1 also prevents any updates of data stored in the first image processing device P1 that occur when the first image processing device P1 executes the prescribed functions. Since the data originally stored in the first image processing device P1 has been acquired while the prescribed functions of the first image processing device P1 have been deactivated, the server controller 81 can transfer the latest data stored in the first image processing device P1 as the data originally stored in the first image processing device P1 to the second image processing device P2.

The job information is also included in the data originally stored in the first image processing device P1 that the server controller 81 sends to the second image processing device P2 in S13. Therefore, the server controller 81 also sends the existent job information to the second image processing device P2 in S13. As a result, the second controller 61 of the second image processing device P2 acquires the data originally stored in the first image processing device P1 from the server controller 81 in S13. The process in which the second controller 61 of the second image processing device P2 acquires the data originally stored in the first image processing device P1 is an example of the process or step of acquiring.

In a state that the first image processing device P1 can still communicate with the user terminal 9 after having deactivated its prescribed functions, the first image processing device P1 may still receive from the user terminal 9 job information specifying jobs such as fax reception job. With the above configuration, jobs specified in the job information received by the first image processing device P1 after the prescribed functions were deactivated can be executed on the second image processing device P2. Thus, unprocessed jobs can be executed on the second image processing device P2 without requiring the user to go through the trouble of retransmitting the job information to the second image processing device P2 from the user terminal 9.

When the second controller 61 of the second image processing device P2 received the instruction, which has been issued as a response to the inquiry sent through the inquiry process of S10, to acquire data originally stored in the first image processing device P1 from the server controller 81, the second controller 61 of the second image processing device P2 acquires the data originally stored in the first image processing device P1 from the server controller 81 in S13 according to the instruction.

Specifically, the second controller 61 of the second image processing device P2 executes the inquiry process in S10 to query the server 8 whether data originally stored in the first image processing device P1 will be acquired from the server 8. Accordingly, when the second controller 61 receives the instruction to acquire data originally stored in the first image processing device P1 as a response to the inquiry issued in the inquiry process, the data originally stored in the first image processing device P1 can be properly transferred to the new image processing device P2 that is replacing the first image processing device P1.

After acquiring the data originally stored in the first image processing device P1 from the server controller 81, in S14 the second controller 61 of the second image processing device P2 sends to the user terminal 9 a completion notification indicating that the transfer of data originally stored in the first image processing device P1 to the second image processing device P2 is complete and that the user should return the first image processing device P1. The completion notification may be issued when the second controller 61 has performed settings based on the settings information included in the received data originally stored in the first image processing device P1. The completion notification may include information indicating that settings based on the settings information is complete. Upon receiving this completion notification from the second image processing device P2, the user terminal 9 displays a message on the screen of the user terminal 9 notifying the user that the transfer of data originally stored in the first image processing device P1 to the second image processing device P2 is complete and prompting the user to return the first image processing device P1.

Upon acquiring the data originally stored in the first image processing device P1 from the server controller 81, the second controller 61 of the second image processing device P2 may also display a message on the display 64 of the second image processing device P2 notifying the user that the transfer of data originally stored in the first image processing device P1 to the second image processing device P2 is complete and prompting the user to return the first image processing device P1 to the service provider.

After sending the notification in S14, in S15 the second controller 61 of the second image processing device P2 issues or sends to the server 8 a completion notification indicating that the transfer of the data originally stored in the first image processing device P1 to the second image processing device P2 is complete. The completion notification may be issued when the controller has performed settings based on the settings information included in the received data originally stored in the first image processing device P1. The completion notification may include information indicating that settings based on the settings information is complete. When thus the server controller 81 receives this completion notification from the second image processing device P2 via the server communication interface 83, in S16 the server controller 81 sends (or issues) to the first image processing device P1 a notification indicating that the second image processing device P2 should be used and the first image processing device P1 returned. Upon receiving this notification from the server controller 81, the first controller 61 of the first image processing device P1 displays on the display 64 of the first image processing device P1 a message prompting the user to begin using the second image processing device P2 and to return the first image processing device P1 to the service provider. The process of S16 is an example of the process or step of sending a notification.

The second image processing device P2 may send completion information when the second controller 61 has completed configuring its settings information, using the settings information for the first image processing device P1 included in the data originally stored in the first image processing device P1 received from the server 8 in S13. Here, completion information indicates that the second controller 61 of the second image processing device P2 has completed configuring settings information thereof, using the settings information for the first image processing device P1 that the server 8 has sent to the second image processing device P2 in S13. When the server communication interface 83 receives the notification from the second image processing device P2 in S15, the server controller 81 may determine whether the completion information has been received from the second image processing device P2.

In this case, the server controller 81 executes the process in S16 upon determining that the server communication interface 83 has received the completion information from the second image processing device P2. The process in which the server controller 81 receives the completion information is an example of the process or step of receiving. Once the second image processing device P2 has completed configuring settings using the settings information for the first image processing device P1, the server controller 81 can encourage the user to transition from the first image processing device P1 to the second image processing device P2 by prompting the user to return the first image processing device P1 to the service provider.

Further, when the server controller 81 determines that the server communication interface 83 has received the completion information from the second image processing device P2, it follows that the second controller 61 of the second image processing device P2 has completed configurations of its settings information on the basis of the settings information for the first image processing device P1 obtained from the server 8 in S13. Thus, the second controller 61 of the second image processing device P2 may also execute a notification process prompting the user to return the first image processing device P1.

As an example of this notification process, the second controller 61 of the second image processing device P2 may display a message on the display 64 of the second image processing device P2 prompting the user to return the first image processing device P1. Once the second image processing device P2 has completed configuring settings information using the received settings information for the first image processing device P1, the second controller 61 of the second image processing device P2 can encourage the user to transition from the first image processing device P1 to the second image processing device P2 by prompting the user to return the first image processing device P1.

In S16 the server controller 81 may also send to the user terminal 9 a notification indicating that the second image processing device P2 should be used and the first image processing device P1 returned. On the basis of this notification from the server controller 81, the user terminal 9 displays a message on the screen of the user terminal 9 prompting the user to begin using the second image processing device P2 and to return the first image processing device P1.

Operations Performed Between the Server 8 and the First Image Processing Device P1

Figure 6:
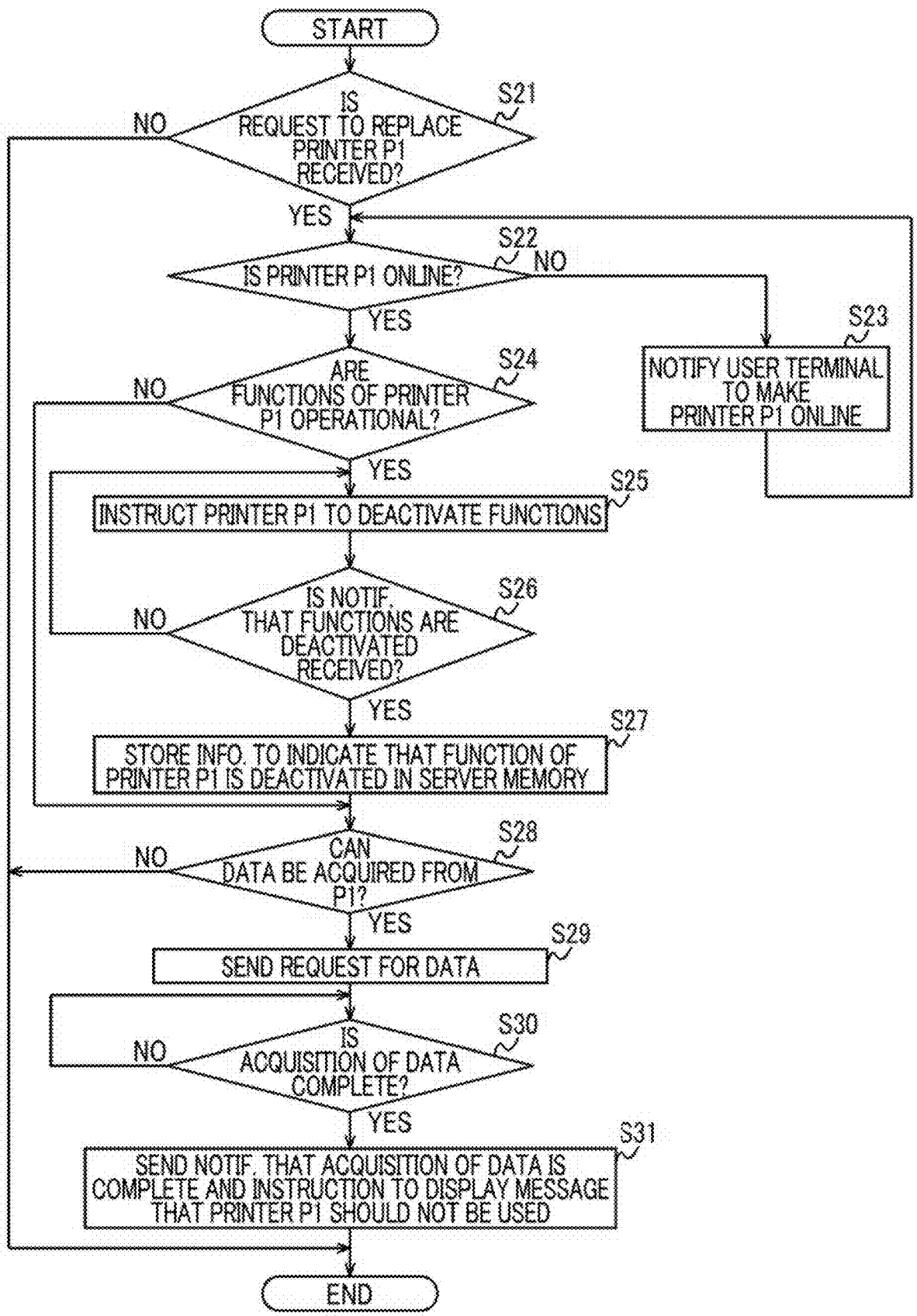
FIG. 6 is a flowchart illustrating a process corresponding to the operations of FIGS. 4 and 5 performed between the server and a first image processing device.

FIG. 6 is a flowchart showing sample operations performed primarily between the server 8 and the first image processing device P1 among the device operations shown in FIGS. 4 and 5. In S21 of FIG. 6, the server controller 81 of the server 8 determines whether a request to replace the first image processing device P1 has been received from the user terminal 9. When no request to replace the first image processing device P1 has been received (S21: NO), the server controller 81 skips the remaining processes in FIG. 6.

However, when the request to replace the first image processing device P1 has been received from the user terminal 9 (S21: YES), in S22 the server controller 81 determines whether the first image processing device P1 is online. The state that the first image processing device P1 is online is a state that the first image processing device P1 is connected to and capable of communicating with the network NT. Thus, a YES determination in S21 signifies that the process in S1 of FIG. 4 has been executed and that the server controller 81 has received a request to replace the first image processing device P1.

When the server controller 81 determines that the first image processing device P1 is offline (S22: NO), in S23 the server controller 81 notifies the user terminal 9 to request the user of the first image processing device P1 to bring the first image processing device P1 online. On the basis of this notification from the server controller 81, the user terminal 9 displays a message on the screen of the user terminal 9 requesting the user of the first image processing device P1 to bring the first image processing device P1 online.

However, when the server controller 81 determines that the first image processing device P1 is online (S22: YES), in S24 the server controller 81 determines whether the prescribed functions of the first image processing device P1 are operational. The server controller 81 determines that the prescribed functions of the first image processing device P1 are operational when the server memory 82 holds information indicating that the first image processing device P1 is in use. Conversely, the server controller 81 determines that the prescribed functions of the first image processing device P1 are not operational when the server memory 82 holds information indicating that the prescribed functions of the first image processing device P1 have been deactivated.

When the server controller 81 determines that the prescribed functions of the first image processing device P1 are not operational (S24: NO), the process advances to S28. However, when the server controller 81 determines that the prescribed functions of the first image processing device P1 are operational (S24: YES), in S25 the server controller 81 sends to the first image processing device P1 an instruction to deactivate the prescribed functions. The process of S25 is equivalent to the process in S2 of FIG. 4.

After sending to the first image processing device P1 the instruction to deactivate the prescribed functions, in S26 the server controller 81 determines whether a notification, which indicates that the prescribed functions have been deactivated, has been received from the first image processing device P1. The server controller 81 loops back to the process in S25 while determining that the notification, which indicates that the prescribed functions have been deactivated, has not been received from the first image processing device P1 (S26: NO).

When the server controller 81 determines that the notification, which indicates the prescribed functions have been deactivated, has received from the first image processing device P1 (S26: YES), in S27 the server controller 81 overwrites information in the server memory 82 specifying that the first image processing device P1 is in use with information specifying that the prescribed functions of the first image processing device P1 have been deactivated.

After overwriting the information in the server memory 82, in S28 the server controller 81 determines whether data stored in the main memory 62 of the first image processing device P1, as the data originally stored in the first image processing device P1, can be acquired from the first image processing device P1. When the server controller 81 determines that the data stored in the main memory 62 of the first image processing device P1 cannot be acquired (S28: NO), the process from S29 is skipped.

However, when the server controller 81 determines that data stored in the main memory 62 of the first image processing device P1 can be acquired (S28: YES), in S29 the server controller 81 sends to the first image processing device P1 a request for the data stored in the main memory 62 of the first image processing device P1, as the data originally stored in the first image processing device P1. The process of S29 is identical to the process in S11 of FIG. 5. After sending the request for the data stored in the first image processing device P1, in S30 the server controller 81 determines whether all data stored in the main memory 62 of the first image processing device P1 has been acquired, as the data originally stored in the first image processing device P1.

While the server controller 81 determines that not all data stored in the main memory 62 of the first image processing device P1 has been acquired (S30: NO), the server controller 81 continues to repeat the determination in S30. The process of S12 of FIG. 5 is completed once the server controller 81 determines that all data stored in the first image processing device P1 has been acquired, as the data originally stored in the first image processing device P1 (S30: YES).

When the server controller 81 determines that all data stored in the first image processing device P1 has been acquired (S30: YES), in S31 the server controller 81 sends to the first image processing device P1 a notification indicating that all data stored in the first image processing device P1 has been acquired, as the data originally stored in the first image processing device P1 and sends an instruction to the first image processing device P1 to display a message indicating that the first image processing device P1 should no longer be used. The process of S31 is executed at any timing after the process of S12 in FIG. 5. On the basis of the instruction received from the server controller 81, the first controller 61 of the first image processing device P1 displays a message on the display 64 of the first image processing device P1 advising the user not to use the first image processing device P1 any longer.

Operations Performed Between the Server 8 and the Second Image Processing Device P2

Figure 7:
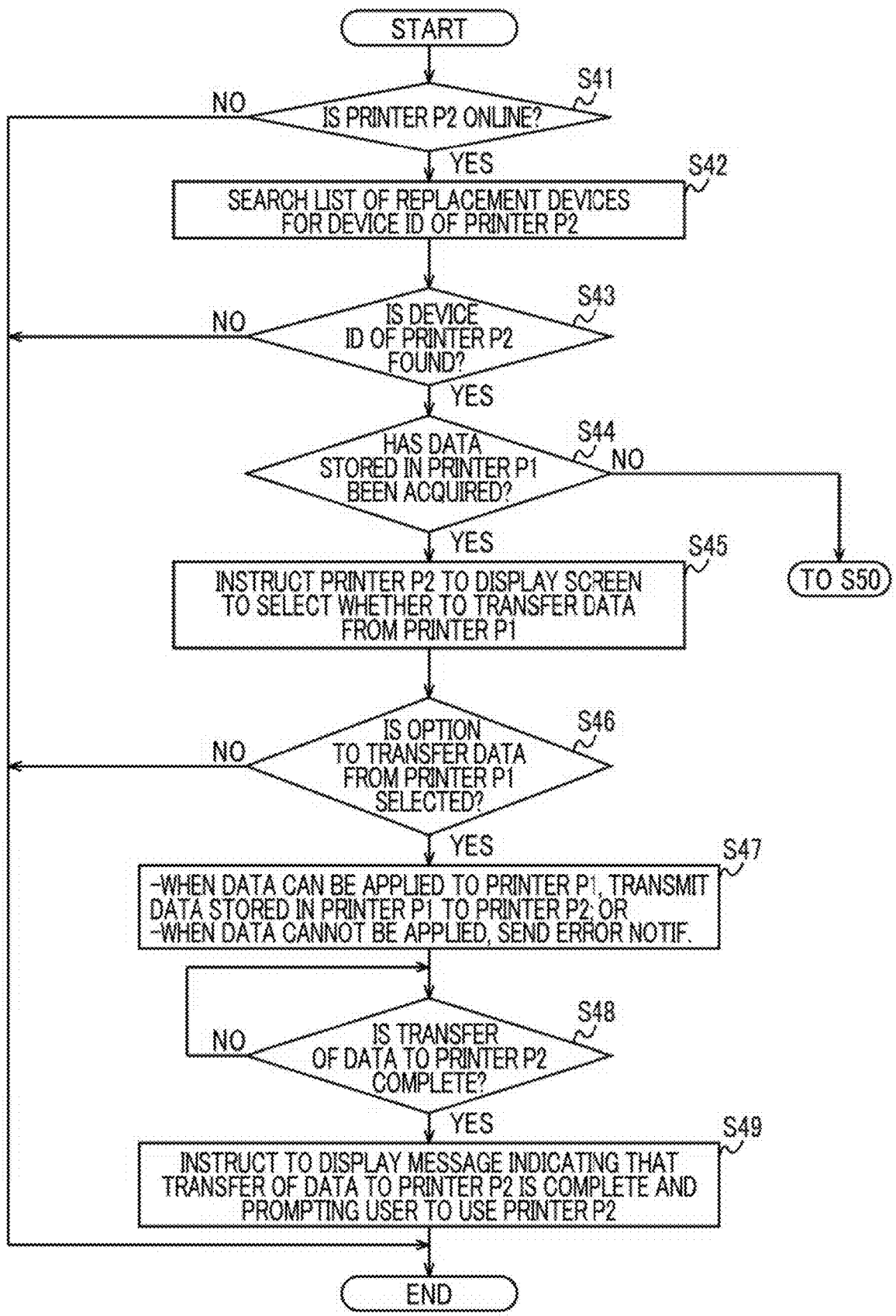
FIG. 7 is a flowchart illustrating a process corresponding to the operations of FIGS. 4 and 5 performed between the server and a second image processing device.
Figure 8:
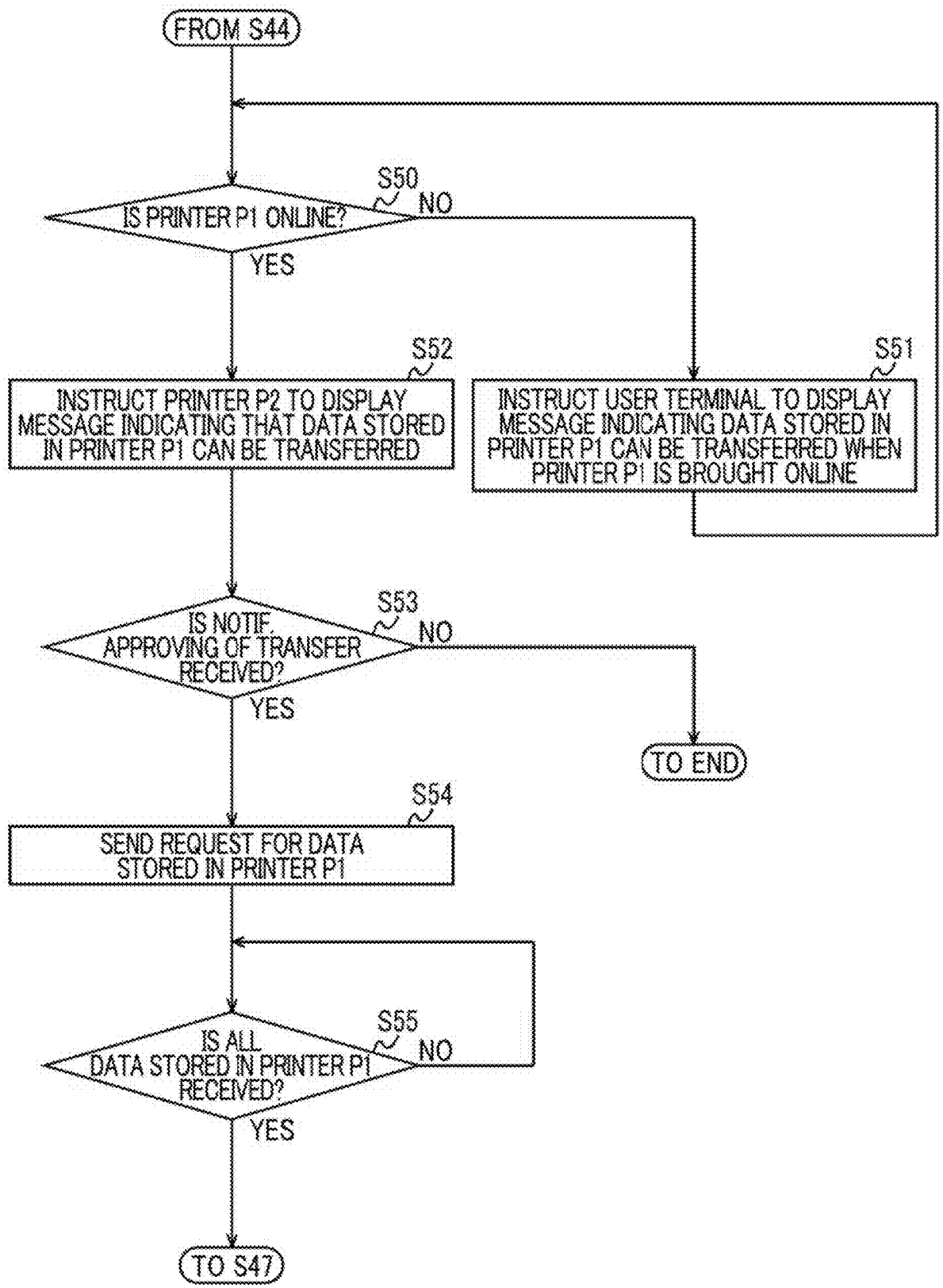
FIG. 8 is a flowchart illustrating a process performed following the process shown in FIG. 7.

FIG. 7 is a flowchart showing sample operations performed primarily between the server 8 and the second image processing device P2 among the device operations shown in FIGS. 4 and 5. FIG. 8 is a flowchart showing a continuation of the operations in FIG. 7. In S41 of FIG. 7, the server controller 81 of the server 8 determines whether the second image processing device P2 is online. The state that the second image processing device P2 is online indicates a state that the second image processing device P2 is connected to and capable of communicating with the network NT. The server controller 81 executes the process in S41 after receiving a request in S1 of FIG. 4 to replace the first image processing device P1.

The server controller 81 determines that the second image processing device P2 is offline when information stored in the server memory 82 indicates that the second image processing device P2 is not connected to the network NT. On the other hand, the server controller 81 determines that the second image processing device P2 is online when information stored in the server memory 82 indicates that the second image processing device P2 is connected to and capable of communicating with the network NT.

When determining that the second image processing device P2 is offline (S41: NO), the server controller 81 skips the remaining processes from S42. However, when determining that the second image processing device P2 is online (S41: YES), in S42 the server controller 81 searches a list of device IDs stored as replacement printers in the server memory 82 for the device ID of the second image processing device P2.

In S43 the server controller 81 determines whether the device ID of the second image processing device P2 is included in the list of device IDs stored as replacement printers. When the server controller 81 determines that the device ID of the second image processing device P2 is not in the list (S43: NO), the process from S44 is skipped.

When the server controller 81 determines that the device ID of the second image processing device P2 is in the list (S43: YES), in S44 the server controller 81 determines whether the data stored in the main memory 62 of the first image processing device P1 has already been acquired, as the data originally stored in the first image processing device P1. This step enables the server controller 81 to acquire data originally stored in the first image processing device P1 when necessary and to avoid needlessly acquiring data that has already been acquired. The process of S44 is an example of the process or step of determining.

When the server controller 81 determines that the data stored in the main memory 62 of the first image processing device P1 has already been acquired, as the data originally stored in the first image processing device P1 (S44: YES), in S45 the server controller 81 sends to the second image processing device P2 an instruction to display a screen for selecting whether to transfer the data originally stored in the first image processing device P1. On the basis of the instruction from the server controller 81, the second controller 61 displays a screen on the display 64 of the second image processing device P2 for specifying whether the data originally stored in the first image processing device P1 is to be transferred. After sending the instruction to the second image processing device P2, in S46 the server controller 81 determines whether the user selected the option to transfer the data originally stored in the first image processing device P1.

When the user inputs a selection on the second input interface 65 to transfer the data originally stored in the first image processing device P1 to the second image processing device P2, the second controller 61 of the second image processing device P2 sends the inputted information, as a notification approving transfer the data originally stored in the first image processing device P1, to the server 8. Upon receiving the information from the second image processing device P2 indicating that data originally stored in the first image processing device P1 is to be transferred, the server controller 81 determines that the user has selected the option to transfer data originally stored in the first image processing device P1.

On the other hand, when the user has inputted a selection on the second input interface 65 not to transfer data originally stored in the first image processing device P1, the second controller 61 of the second image processing device P2 sends the inputted information to the server 8. Upon receiving the information from the second image processing device P2 indicating that data originally stored in the first image processing device P1 is not to be transferred, the server controller 81 determines that the user has not selected the option to transfer data originally stored in the first image processing device P1.

When the server controller 81 determines that the option to transfer the data originally stored in the first image processing device P1 has not been selected (S46: NO), the remaining process from S47 is skipped.

When the server controller 81 determines that the option to transfer the data originally stored in the first image processing device P1 has been selected (S46: YES), the server controller 81 may determine whether the data originally stored in the first image processing device P1 can be applied to the second image processing device P2. The process in which the server controller 81 determines whether the data originally stored in the first image processing device P1 can be applied to the second image processing device P2 is an example of the process or step of determining.

For example, the server controller 81 determines that the data originally stored in the first image processing device P1 can be applied to and thus transferred to the second image processing device P2 when the model of the first image processing device P1 matches the model of the second image processing device P2. Conversely, the server controller 81 determines that the data originally stored in the first image processing device P1 can be neither applied to nor transferred to the second image processing device P2 when the models do not match. Alternatively, the server controller 81 may determine that the data originally stored in the first image processing device P1 can be applied to and thus transferred to the second image processing device P2 when settings based on the settings information included in the data originally stored in the first image processing device P1 can be set in the second image processing device P2 and/when at least one job of the job information in the data originally stored in the first image processing device P1 can be printed by in the second image processing device P2.

Information for printers (the image processing devices 1) such as the device IDs are stored in the server memory 82 in advance in association with their models. The server controller 81 determines whether the model of the first image processing device P1 matches the model of the second image processing device P2 on the basis of the associated information for printers (device IDs) and model information stored in the server memory 82.

When the server controller 81 determines that the data originally stored in the first image processing device P1 cannot be applied to the second image processing device P2, in S47 the server controller 81 sends an error notification to the second image processing device P2. After sending the error notification to the second image processing device P2, the server controller 81 halts operations without continuing the process from S48.

However, when the server controller 81 determines that the data originally stored in the first image processing device P1 can be applied to the second image processing device P2, in S47 the server controller 81 sends the data originally stored in the first image processing device P1 to the second image processing device P2. Therefore, only data, which the second image processing device P2 can implement, can be transferred from the first image processing device P1 to the second image processing device P2. The process performed by the server controller 81 in S47 to send the data originally stored in the first image processing device P1 to the second image processing device P2 is identical to the process in S13 of FIG. 5. As described, in a case the prescribed condition is satisfied, the server controller 8 sends the data originally stored in the image processing device P1 to the second image processing device P2. In this case, for satisfying the prescribed condition, satisfying a condition that the server controller 81 has determined that the data originally stored in the first image processing device P1 can be applied to the second image processing device P2 is necessary. The prescribed condition may be satisfied, when the condition that the prescribed function of the first image processing device P1 has been deactivated on the basis of the request received by the server 8 and the condition that the server controller 81 has determined that the data originally stored in the first image processing device P1 can be applied to the second image processing device P2 are both satisfied.

After beginning to send to the second image processing device P2 the data originally stored in the first image processing device P1, in S48 the server controller 81 determines whether the transfer of data to the second image processing device P2 is complete. While the transfer of data is not complete (S48: NO), the server controller 81 repeats the determination in S48.

Once the transfer of data to the second image processing device P2 is complete (S48: YES), in S49 the server controller 81 sends (or issues) to the second image processing device P2 an instruction to display a message indicating that the transfer of data to the second image processing device P2 is complete and prompting the user to use the second image processing device P2. On the basis of this instruction from the server controller 81, the second controller 61 of the second image processing device P2 displays a message on the display 64 of the second image processing device P2 indicating that the transfer of data to the second image processing device P2 is complete and prompting the user to begin using the second image processing device P2.

When the first image processing device P1 is online at this time, the server controller 81 may also send to the first image processing device P1 an instruction to display a message indicating that the transfer of data to the second image processing device P2 is complete and prompting the user to begin using the second image processing device P2. On the basis of this instruction from the server controller 81, the first controller 61 of the first image processing device P1 then displays a message on the display 64 of the first image processing device P1 indicating that the transfer of data to the second image processing device P2 is complete and prompting the user to begin using the second image processing device P2.

However, when the server controller 81 determines in S44 that data originally stored in the first image processing device P1 has not already been acquired (S44: NO), in S50 of FIG. 8 the server controller 81 determines whether the first image processing device P1 is online. When the server controller 81 determines that the first image processing device P1 is offline (S50: NO), in S51 the server controller 81 sends to the second image processing device P2 an instruction to display a message indicating that data stored in the main memory 62 of the first image processing device P1 as the data originally stored in the first image processing device P1 can be transferred when the first image processing device P1 is brought online. After sending the instruction to the second image processing device P2, the server controller 81 returns to S50.

On the basis of this instruction from the server controller 81, the second controller 61 of the second image processing device P2 displays on the display 64 of the second image processing device P2 a message indicating that data stored in the main memory 62 of the first image processing device P1 as the data originally stored in the first image processing device P1 can be transferred to the second image processing device P2 when the first image processing device P1 is brought online.

In S51 the server controller 81 may also sends to the user terminal 9 an instruction to display the same message indicating that data stored in the main memory 62 of the first image processing device P1 as the data originally stored in the first image processing device P1 can be transferred when the first image processing device P1 is brought online. On the basis of this instruction from the server controller 81, the user terminal 9 displays a message on the screen of the user terminal 9 indicating that data stored in the main memory 62 of the first image processing device P1 as the data originally stored in the first image processing device P1 can be transferred when the first image processing device P1 is online.

When the server controller 81 determines that the first image processing device P1 is online (S50: YES), in S52 the server controller 81 sends to the second image processing device P2 an instruction to display a message indicating that data originally stored in the first image processing device P1 can be transferred. The process in S51 and S52 is identical to that in S7 of FIG. 4. In S52 the server controller 81 sends to the second image processing device P2 an instruction to display a screen for selecting whether to transfer the data originally stored in the first image processing device P1 similarly to S45. Further, upon receipt of the instruction to display the screen for selecting whether to transfer the data originally stored in the first image processing device P1, the second controller 61 sends to the user terminal 9 a notification to request the user to select whether to transition to the second image processing device P2. This notification may include an instruction to display a screen for selecting whether to transfer the data originally stored in the first image processing device P1.

After sending these instructions to the second image processing device P2, in S53 the server controller 81 determines whether a notification approving of the transfer has been received from the user terminal 9. The user terminal 9 sends to the server 8 a notification indicating that the transfer has been approved when the user of the user terminal 9 selects an option on the user terminal 9 approving the transfer of data originally stored in the first image processing device P1 to the second image processing device P2.

When the server controller 81 determines that the notification approving of the transfer has not been received from the second image processing device P2 (S53: NO), the server controller 81 ends operations without executing the remainder of the process. However, when the server controller 81 determines that the notification approving of the transfer has been received from the second image processing device P2 (S53: YES), in S54 the server controller 81 sends to the first image processing device P1 a request for data stored in the main memory 62 of the first image processing device P1 as the data originally stored in the first image processing device P1. The process of S54 is identical to the process of S11 in FIG. 5. As described above, when the server 8 has received the request in S8, the server controller 81 determines whether the data originally stored in the first image processing device P1 has been acquired in S44. Thereafter, when the server controller 81 has determined that the data originally stored in the first image processing device P1 has not been acquired (S44: NO), the server controller 81 acquires from the first image processing device P1 the data stored in the first image processing device, as the data originally stored in the first image processing device in S54.

After sending the request for data stored in the main memory 62 of the first image processing device P1 as the data originally stored in the first image processing device P1, in S55 the server controller 81 determines whether all data stored in the first image processing device P1 has been acquired and repeats this determination in S55 while all data originally stored in the first image processing device P1 has not been acquired (S55: NO). When the server controller 81 determines that all data stored in the main memory 62 of the first image processing device P1 as the data originally stored in the first image processing device P1 has been acquired (S55: YES), the server controller 81 advances to S47 in FIG. 7. In other words, a YES determination in S55 signifies that data stored in the main memory 62 of the first image processing device P1 has been acquired as the data originally stored in the first image processing device P1 in S12 of FIG. 5.

As described above, the server controller 81 sends data originally stored in the first image processing device P1 to the second image processing device P2 while the prescribed functions of the first image processing device P1 are deactivated. Deactivating the prescribed functions on the first image processing device P1 can encourage the user to transition from the first image processing device P1 to the second image processing device P2.

Further, in a case that the first image processing device P1 receives print data after deactivating the prescribed functions, for example, this print data can be transferred as the data originally stored in the first image processing device P1 to the second image processing device P2, thereby saving the user the trouble tasks to resend the same print data to the second image processing device P2 using the user terminal 9.

First Variation

In the embodiment the image processing device 100 includes the single server 8. However, the image processing system 100 may be provided with two or more servers 8. In this case, one or more of the two or more servers 8 execute the processes of the server 8 shown in FIGS. 4 through 8. Thus, the servers 8 can cooperate with each other to execute the processes of FIGS. 4 through 8 executed by the single server 8 in the embodiment.

Second Variation

When the server controller 81 sets the second image processing device P1 as a device to replace the first image processing device P1, the server controller 81 may store the device ID of the first image processing device P1 and the device ID of the second image processing device P2 in an associated manner. The server controller 81 may determine whether the server memory 82 stores the device ID of the first image processing device P1 in association with the device ID of the image processing device P2 following the process of S41 or S42 of FIG. 7. The server controller 81 need not continue the process of FIG. 7 when determining that the server memory 82 does not store device IDs of the first image processing device P1 and image processing device P2 in association with each other.

When the server controller 81 determines that the device ID of the first image processing device P1 is stored in the server memory 82 in association with the device ID of the second image processing device P2, the server controller 81 advances to S42 or S43 and performs the processes from S42 or S43. Thereafter, when a YES determination is made in S48, the YES determination signifies that the data originally stored in the first image processing device P1 has been transferred to the second image processing device P2. Hence, the server 8 can send the data originally stored in the first image processing device P1 to the second image processing device P2 associated with that image processing device P1. Accordingly, the data originally stored in the first image processing device P1 can be properly transferred to the second image processing device P2 that is replacing the first image processing device P1. As described in the embodiment, in a case the prescribed condition is satisfied, the server controller 8 sends the data originally stored in the image processing device P1 to the second image processing device P2. In this variation, for satisfying the prescribed condition, satisfying a condition that the server memory 82 stores the association data associating the first image processing device P1 with the second image processing device P2 is necessary. In this variation, the prescribed condition may be satisfied when the condition that the prescribed function of the first image processing device P1 has been deactivated on the basis of the request received by the server 8 and the condition that the server memory 82 stores the association data associating the first image processing device P1 with the second image processing device P2 are both satisfied.

Third Variation

When the second image processing device P2 is connected to the network NT, the second image processing device P2 may send the user identification information to the server 8. For example, the second image processing device P2 may send the user identification information to the server in the process of S6 shown in FIG. 4. The server memory 82 stores association data associating user identification information identifying a user with the first image processing device. The server controller 81 may execute the following process after completing the process of S41 or S42 of FIG. 7. That is, the server controller 81 may determine whether the user identification information stored in the server memory 82 in association with the first image processing device P1 has been sent to the server 8 from the second image processing device P2 that has been connected to the server 8 in S5 of FIG. 4.

The server controller 81 does not execute the remaining process when determining that user identification information has not been sent to the server 8 from the second image processing device P2. When the server controller 81 determines that user identification information has been sent to the server 8 from the second image processing device P2, the server controller 81 advances to S42 or S43 and performs the processes from S42 or S43. Thereafter, when a YES determination is made in S48, the YES determination signifies that the data originally stored in the first image processing device P1 has been sent to the second image processing device P2. As described in the embodiment, in a case the prescribed condition is satisfied, the server controller 8 sends the data originally stored in the image processing device P1 to the second image processing device P2. In this variation, for satisfying the prescribed condition, satisfying a condition that the server controller 81 has received from the second image processing device P2 the user identification information which is associated with the first image processing device in the association data is necessary. In the present variation, the prescribed condition may be satisfied when the condition that the prescribed function of the first image processing device P1 has been deactivated on the basis of the request received by the server 8 and the condition that the server controller 81 has received from the second image processing device P2 the user identification information which is associated with the first image processing device in the association data are both satisfied.

Accordingly, when user identification information associated with the first image processing device P1 has been received from the second image processing device P2, the server 8 can send the data originally stored in the first image processing device P1 to the second image processing device P2. Therefore, the data originally stored in the first image processing device P1 can be properly transferred to the second image processing device P2 that will be replacing the first image processing device P1, and the user identified by the user identification information can use the second image processing device P2.

Fourth Variation

When determining in S28 (FIG. 6) that data can be acquired from the first image processing device P1 (S28: YES), the server controller 81 may send to the first image processing device P1 an instruction to display a screen enabling the user to input authentication information for authorizing the transmission of the data originally stored in the first image processing device P1 to the second image processing device P2. In this case, the controller 61 of the first image processing device P1 controls the display 64 of the first image processing device P1 to display a screen for inputting authentication information in response to the instruction received from the server controller 81.

Once the user has inputted authentication information through the first input interface 65, the first controller 61 of the first image processing device P1 sends the inputted authentication information to the server 8. Upon acquiring the authentication information from the first image processing device P1, the server controller 81 stores the authentication information in the server memory 82 in association with the first image processing device P1. For example, the server controller 81 may store the authentication information in the server memory 82 in association with the device ID of the first image processing device P1. The process in which the server controller 81 acquires the authentication information and stores the authentication information in the server memory 82 in association with the first image processing device P1 is an example of the process or step of storing (or the third storing process or step).

When the server controller 81 subsequently determines in S46 that the user has selected the option to transfer the data originally stored in the first image processing device P1 (S46: YES), the server controller 81 sends to the second image processing device P2 an instruction to display a screen in which the user can input authentication information. The server controller 81 may send the same instruction to the second image processing device P2 when a YES determination is made in S53 shown in FIG. 8. According to the instruction received from the server controller 81, the second controller 61 of the second image processing device P2 controls the display 64 of the second image processing device P2 to display a screen for inputting authentication information. Once the user has inputted authentication information via the input interface 65, the second controller 61 of the second image processing device P2 sends this authentication information to the server 8.

Subsequently, the server controller 81 determines whether the authentication information received from the second image processing device P2 that has been connected to the server 8 in S5 of FIG. 4 matches the authentication information stored in the server memory 82 in association with the first image processing device P1. When the server controller 81 determines that the authentication information received from the second image processing device P2 differs from that stored in association with the first image processing device P1, in S47 the server controller 81 sends an error notification to the second image processing device P2.

On the other hand, when the server controller 81 determines that the authentication information received from the second image processing device P2 matches the authentication information stored in the server memory 82 in association with the first image processing device P1, in S47 the server controller 81 sends the data originally stored in the first image processing device P1 to the second image processing device P2. In other words, after the server controller 81 has received the request in S21, the server controller 81 acquires the authentication information and stores the authentication information in association with the first image processing device. As described in the embodiment, in a case the prescribed condition is satisfied, the server controller 8 sends the data originally stored in the image processing device P1 to the second image processing device P2. In this variation, for satisfying the prescribed condition, satisfying a condition that the server controller 81 has received from the second image processing device P2 authentication information matching the stored authentication information in association with the first image processing device P1 is necessary. In the present variation, the prescribed condition may be satisfied when the condition that the prescribed function of the first image processing device P1 has been deactivated on the basis of the request received by the server 8 and the condition that the server controller 81 has received from the second image processing device P2 authentication information matching the stored authentication information in association with the first image processing device P1 are both satisfied.

Thus, the server controller 81 can send the data originally stored in the first image processing device P1 to the second image processing device P2 once the second image processing device P2 has sent the authentication information to the server 8 that matches the authentication information associated with the first image processing device P1. Accordingly, the transfer of data from the first image processing device P1 to the second image processing device P2 can be authorized and the data originally stored in the first image processing device P1 can be properly transferred to the second image processing device P2 that will be replacing the first image processing device P1.

Fifth Variation

The second main memory 62 of the second image processing device P2 may store, in advance, replacement device information indicating that the second image processing device P2 is the device to replace the first image processing device P1. When the second image processing device P2 is connected to the network NT, the second image processing device P2 may send the replacement device information to the server 8. For example, the second image processing device P2 may send the replacement device information to the server in the process of S6 shown in FIG. 4. In this case, when the user has selected the option to transfer the data originally stored in the first image processing device P1 (S46: YES), the server controller 81 may determine whether the second image processing device P2 that has been connected to the server 8 in S5 of FIG. 4 has sent replacement device information to the server 8.

When the server controller 81 determines that the replacement device information has not been received from the second image processing device P2, in S47 the server controller 81 sends an error notification to the second image processing device P2. When the server controller 81 determines that the replacement device information has been received from the second image processing device P2, in S47 the server controller 81 sends the data originally stored in the first image processing device P1 to the second image processing device P2. As described in the embodiment, in a case the prescribed condition is satisfied, the server controller 8 sends the data originally stored in the image processing device P1 to the second image processing device P2. In this variation, for satisfying the prescribed condition, satisfying a condition that the server controller 81 has received the replacement device information from the second image processing device P2 is necessary. In this variation, the prescribed condition may be satisfied when the condition that the prescribed function of the first image processing device P1 has been deactivated on the basis of the request received by the server 8 and the condition that the server controller 81 has received the replacement device information from the second image processing device P2 are both satisfied.

Thus, the server controller 81 can send the data originally stored in the first image processing device P1 to the second image processing device P2 once the server 8 has receives the replacement device information from the second image processing device P2. Accordingly, the data originally stored in the first image processing device P1 can be properly transferred to the second image processing device P2 that will be replacing the first image processing device P1.

Sixth Variation

When the first controller 61 of the first image processing device P1 receives a request for data stored in the first image processing device P1 in S11 of FIG. 5, in S12 the first controller 61 may encrypt the data stored in the first image processing device P1 and sends the encrypted data, as the data originally stored in the first image processing device P1, to the server 8. Further, when the second controller 61 of the second image processing device P2 receives the encrypted data as the data originally stored in the first image processing device P1 from the server 8 in S13, the second controller 61 of the second image processing device P2 decrypts the encrypted data. Encrypting the data originally stored in the first image processing device P1 can reduce the possibility of the data being overwritten.

Seventh Variation

The drum cartridge 20 may include the developing roller 41 in addition to the photosensitive drum 21, the cartridge case, the drum memory 22, and the charger. In this case, the photosensitive drum 21, the drum memory 22, the charger, and the developing roller 41 are provided in the cartridge case. Additionally, the toner cartridge 4 includes the cartridge case and the toner memory 42 but not the developing roller 41. The cartridge case of the toner cartridge 4 accommodates toner. The outer circumferential surface of the developing roller 41 contacts the outer circumferential surface of the photosensitive drum 21 inside the drum cartridge 20.

Eighth Variation

The toner cartridge 4 may be configured of two cartridges (not shown). In this case, the first of the two cartridges constituting the toner cartridge 4 includes the developing roller 41, while the second cartridge includes the cartridge case and the toner memory 42. The cartridge case of the toner cartridge 4 accommodates toner.

Ninth Variation

The image processing device 1 (P1, or P2) may be provided with one or more unified cartridges (not shown) in place of the drum cartridges 20 and the toner cartridges 4. Each unified cartridge includes the photosensitive drum 21, a cartridge case, a memory, the charger, and the developing roller 41. The outer circumferential surface of the developing roller 41 contacts the outer circumferential surface of the photosensitive drum 21 inside this unified cartridge. The cartridge case of this unified cartridge accommodates toner.

Tenth Variation

Each of the drum cartridges 20 and toner cartridges 4 of the image processing device 1 (P1, or P2) may be capable of being mounted in and removed from the main casing 10 independently.

Eleventh Variation

The image processing device 1 (P1, or P2) may also be a multifunction peripheral (MFP) provided with other functions such as a scan or facsimile function. When the MFP has a print function, copy function, scan function, facsimile function, and the like, the jobs related to image processes include print jobs, scan jobs related to the scan function, and fax jobs related to the facsimile function. That is, the print jobs are to execute printing, scan jobs are to execute the scanning, and fax jobs are to execute the facsimile transmission or facsimile reception. Thus, an image processing device 1 configured as an MFP may still execute the same various processes described in the first embodiment. The image processing device 1 of this variation obtains the same effects as the image processing device 1 in the first embodiment described above.

Twelfth Variation

The print medium used in the image processing device 1 (P1, or P2) is not limited to paper but may be tape, for example. When the print medium is tape, a tape cassette for supplying tape is mounted in the image processing device 1, and the image processing device 1 prints on tape conveyed from the tape cassette. In this case, the image processing device 1 may be a laser printer or an inkjet printer.

Thirteenth Variation

The image processing device 1 (P1, or P2) may be an inkjet printer. When the image processing device 1 is an inkjet printer, ink cartridges are mounted in the cartridge retaining members 13 of the image processing device 1 instead of the drum cartridges 20 and toner cartridges 4 described in the embodiment. There is no particular restriction on the number of ink cartridges mounted in the image processing device 1. For example, a total of four ink cartridges corresponding to the four colors cyan, magenta, yellow, and black may be mounted in the image processing device 1, or a single cartridge for the single color black may be mounted in the image processing device 1.

Each ink cartridge has a built-in ink memory. The ink memory stores an ink ID, ink type information, and a residual ink quantity, for example. Here, the residual ink quantity is not essential information. The ink ID is information similar to the toner ID. The ink type information is information similar to the toner type information.

Steps performed in the various processes described in the embodiment are similar when the image processing device 1 is an inkjet printer. Specifically, when the image processing device 1 is an inkjet printer, the terms "toner cartridge 4," "toner memory 42," "toner ID," and "toner type information" in the description of the embodiment may be replaced with the terms "ink cartridge," "ink memory," "ink ID," and "ink type information." Thus, the same effects described for the image processing device 1 in the embodiment are obtained when the image processing device 1 is an inkjet printer.

Example Implemented by Software

Functions of the image processing device 1 (P1, or P2) are implemented by data processing programs that cause the controller 61 of the image processing device 1, as a computer, execute various functions. Similarly, functions of the server 8 are implemented by data processing programs that cause the server controller 81 of the server 8, as a computer, execute various functions.

In this case, to execute the data processing programs described above, the image processing device 1 (P1, or P2) includes as hardware at least one controller 61 as a processor and at least one memory 62. The functions in the embodiment are implemented by executing the data processing programs using the controller 61 and the memory 62.

In this case, to execute the data processing programs described above, the server 8 includes as hardware at least one server controller 81 as a processor and at least one server memory 82. The functions in the embodiment are implemented by executing the data processing programs using the server controller 81 and the server memory 82.

The data processing programs may be stored in non-transitory computer-readable one or more storage media. The image processing device 1 may include the storage media or may not include the storage media. When the image processing device 1 does not include the storage media, the data processing programs may be supplied to the image processing device 1 via wired or wireless arbitrary transmission media. Similarly, the server 8 may include the storage media or may not include the storage media. When the server 8 does not include the storage media, the data processing programs may be supplied to the server 8 via wired or wireless arbitrary transmission media.

All or a part of functions of the controller 61 and the server controller 81 may be implemented by a logical circuit. For example, the present disclosure includes in scope a case that the controller 61 includes an integrated circuit in which logical circuits functioning as control blocks are formed. Further, the present disclosure includes in scope a case that the server controller 81 includes an integrated circuit in which a logical circuit functioning as control blocks is formed. Alternatively, a part of functions of the controller 61 and the server controller 81 may be implemented by quantum computers.

Additional Remark

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

The invention claimed is:

1. A system comprising:
a first image processing device;
a second image processing device;
a memory; and
a server including
a server processor;
wherein the server processor is configured to perform:
receiving a request to replace the first image processing device;
in response to reception of the request, sending to the first image processing device an instruction to deactivate a prescribed function;
acquiring from the first image processing device data stored in the first image processing device, the data including settings information of the first image processing device;
storing, in the memory, the acquired data as transition data including the settings information;
establishing communication with the second image processing device which is a replacement device of the first image processing device; and
in a case that a prescribed condition is satisfied, sending the transition data to the second image processing device, the prescribed condition including a requirement that the establishing has been performed.

2. The system according to claim 1, wherein the prescribed condition further includes a requirement that the prescribed function of the first image processing device has been deactivated.

3. The system according to claim 1, wherein the acquiring is performed when the prescribed function of the first image processing device has been deactivated.

4. The system according to claim 3, wherein the server processor is configured to further perform:
when the server processor has received the request, determining whether the data stored in the first image processing device has been acquired,
wherein when the server processor has determined that the data stored in the first image processing device has not been acquired, the acquiring is performed.

5. The system according to claim 1, wherein the first image processing device includes a first-device processor and a first-device memory,
wherein the first-device processor is configured to perform:
in a case that the first image processing device has received job information related to an image process from an external terminal after the prescribed function has been deactivated, storing the job information in the first-device memory,
wherein the data stored in the first-device memory includes the job information that the first image processing device has received after the prescribed function has been deactivated according to the instruction and thus the transition data includes the job information that the first image processing device has received after the prescribed function has been deactivated according to the instruction,
wherein in the sending, the server processor sends, to the second image processing device, the job information that the first image processing device has received after the prescribed function has been deactivated according to the instruction by sending the transition data to the second image processing device.

6. The system according to claim 1, wherein for satisfying the prescribed condition, satisfying a requirement that the memory stores association data associating the first image processing device with the second image processing device is necessary.

7. The system according to claim 1, wherein the memory stores association data associating user identification information identifying a user with the first image processing device,
- wherein for satisfying the prescribed condition, satisfying a requirement that the server has received from the second image processing device the user identification information which is associated with the first image processing device in the association data is necessary.

8. The system according to claim 1, wherein the server processor is configured to further perform:
- after the server processor has received the request in the receiving, acquiring authentication information and storing the authentication information in association with the first image processing device in the memory,
- wherein for satisfying the prescribed condition, satisfying a requirement that the server has received from the second image processing device authentication information matching the stored authentication information in association with the first image processing device is necessary.

9. The system according to claim 1, wherein the second image processing device stores, in advance, replacement device information indicating that the second image processing device is a device to replace the first image processing device,
- wherein for satisfying the prescribed condition, satisfying a requirement that the server has received the replacement device information from the second image processing device is necessary.

10. The system according to claim 1, wherein the server processor is configured to further perform:
- determining whether the transition data can be applied to the second image processing device,
- wherein for satisfying the prescribed condition, satisfying a requirement that the server processor has determined that the transition data can be applied to the second image processing device is necessary.

11. The system according to claim 1, wherein the prescribed function is a function to execute the image process.

12. The system according to claim 1, wherein the server processor is configured to further perform:
- receiving a completion notification from the second image processing device, the completion notification indicating that settings based on the settings information included in the transition data are complete; and
- when the server processor has received the completion notification from the second image processing device, issuing a notification prompting a user to return the first image processing device.

13. The system according to claim 1, wherein the server processor is configured to further perform:
- determining whether settings based on the settings information included in the transition data can be set in the second image processing device,
- wherein for satisfying the prescribed condition, satisfying a condition that the server processor has determined that the settings included in the transition data can be set in the second image processing device is necessary.

14. The system according to claim 1, wherein the server processor is configured to further perform:
- when the server processor has received the request, preparing to send the second image processing device so that the second image processing device is to be a subscribed device in place of the first image processing device.

15. The system according to claim 1, wherein the request received in the receiving is a request to replace the first image processing device that operates as a subscribed device that is currently registered as a subject of an agreement,
- wherein the settings information includes mode information indicating a subscription mode in which an operation is to be performed under the agreement,
- wherein in the sending the data, the server processor sends the transition data to the second image processing device so that the second image processing device can configure settings based on the settings information and can perform the operation as the subscribed device in place of the first image processing device.

16. A data processing method for managing a first image processing device and a second image processing device using a server, the data processing method comprising:
- the server receiving a request to replace the first image processing device;
- in response to reception of the request by the server, the server sending to the first image processing device an instruction to deactivate a prescribed function;
- the server acquiring from the first image processing device data stored in the first image processing device, the data including settings information of the first image processing device;
- the server storing the acquired data as transition data including the settings information;
- the server establishing communication with the second image processing device which is a replacement device of the first image processing device; and
- in a case that a prescribed condition is satisfied, the server sending the transition data to the second image processing device, the prescribed condition including a requirement that the establishing has been performed.

17. A non-transitory computer readable storage medium storing a set of program instructions installed on and executed by a processor of a server, the set of program instructions, when executed by the processor, causing the server to perform operations comprising:
- receiving a request to replace a first image processing device;
- in response to reception of the request, sending to the first image processing device an instruction to deactivate a prescribed function;
- acquiring from the first image processing device data stored in the first image processing device, the data including settings information of the first image processing device;
- storing, in a memory, the acquired data as transition data including the settings information;
- establishing communication with a second image processing device which is a replacement device of the first image processing device; and
- in a case that a prescribed condition is satisfied, sending the transition data to the second image processing device, the prescribed condition including a requirement that the establishing has been performed.

* * * * *